(12) United States Patent
Itou et al.

(10) Patent No.: US 7,362,400 B2
(45) Date of Patent: Apr. 22, 2008

(54) TRANSREFLECTIVE LIQUID CRYSTAL DISPLAY PANEL HAVING A WIDE VIEWING ANGLE

(75) Inventors: Osamu Itou, Tokyo (JP); Makoto Abe, Tokoy (JP)

(73) Assignee: Hitachi Displays, Ltd., Chiba (JP)

( * ) Notice: Subject to any disclaimer, the term of this patent is extended or adjusted under 35 U.S.C. 154(b) by 152 days.

(21) Appl. No.: 10/953,590

(22) Filed: Sep. 29, 2004

(65) Prior Publication Data
US 2005/0105033 A1 May 19, 2005

(30) Foreign Application Priority Data
Sep. 29, 2003 (JP) .............................. 2003-337684

(51) Int. Cl.
*G02F 1/1343* (2006.01)
*G02F 1/1335* (2006.01)
(52) U.S. Cl. ...................... 349/141; 349/114; 349/146
(58) Field of Classification Search ................ 349/141, 349/114, 146
See application file for complete search history.

(56) References Cited

U.S. PATENT DOCUMENTS

| 6,137,557 | A * | 10/2000 | Hebiguchi et al. .......... 349/141 |
| 6,341,004 | B1 * | 1/2002 | Kondo et al. ............... 349/141 |
| 6,583,840 | B1 * | 6/2003 | Inoue et al. ................ 349/141 |
| 6,859,248 | B2 * | 2/2005 | Matsumoto et al. ........ 349/141 |
| 6,862,067 | B2 * | 3/2005 | Matsumoto et al. ........ 349/141 |
| 6,987,552 | B2 * | 1/2006 | Yamazaki et al. .......... 349/141 |
| 2002/0033922 | A1 * | 3/2002 | Hidehira et al. ............ 349/141 |

FOREIGN PATENT DOCUMENTS

| JP | H11-242226 | 9/1999 |
| JP | 2002-139737 | 5/2002 |
| JP | 2003-21824 | 1/2003 |
| JP | 2003-21825 | 1/2003 |

* cited by examiner

*Primary Examiner*—Mike Qi
(74) *Attorney, Agent, or Firm*—Hogan & Hartson LLP

(57) ABSTRACT

The comb like electrodes to drive the orientation of the liquid crystal through the lateral electric field in the IPS (In plane Switching) LCD panel has a construction that the comb like electrodes are optically reflective, are projections in the gap area and have curved surfaces in the cross section of the electors.

9 Claims, 16 Drawing Sheets

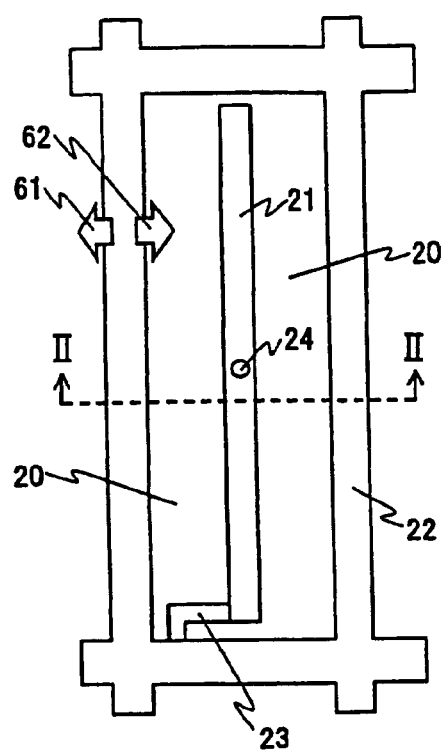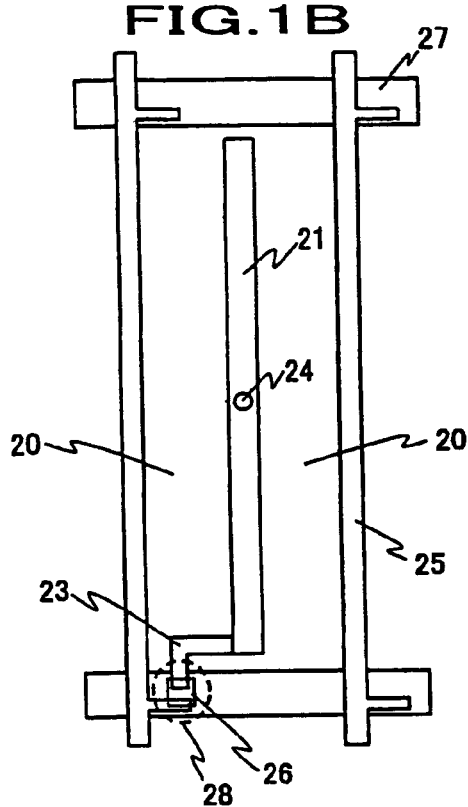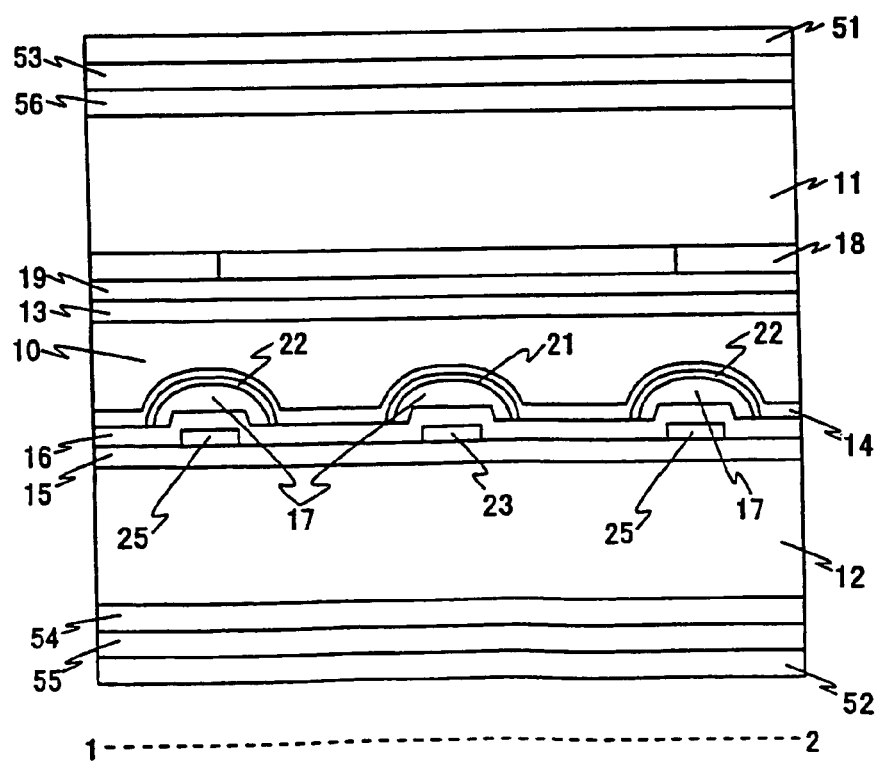

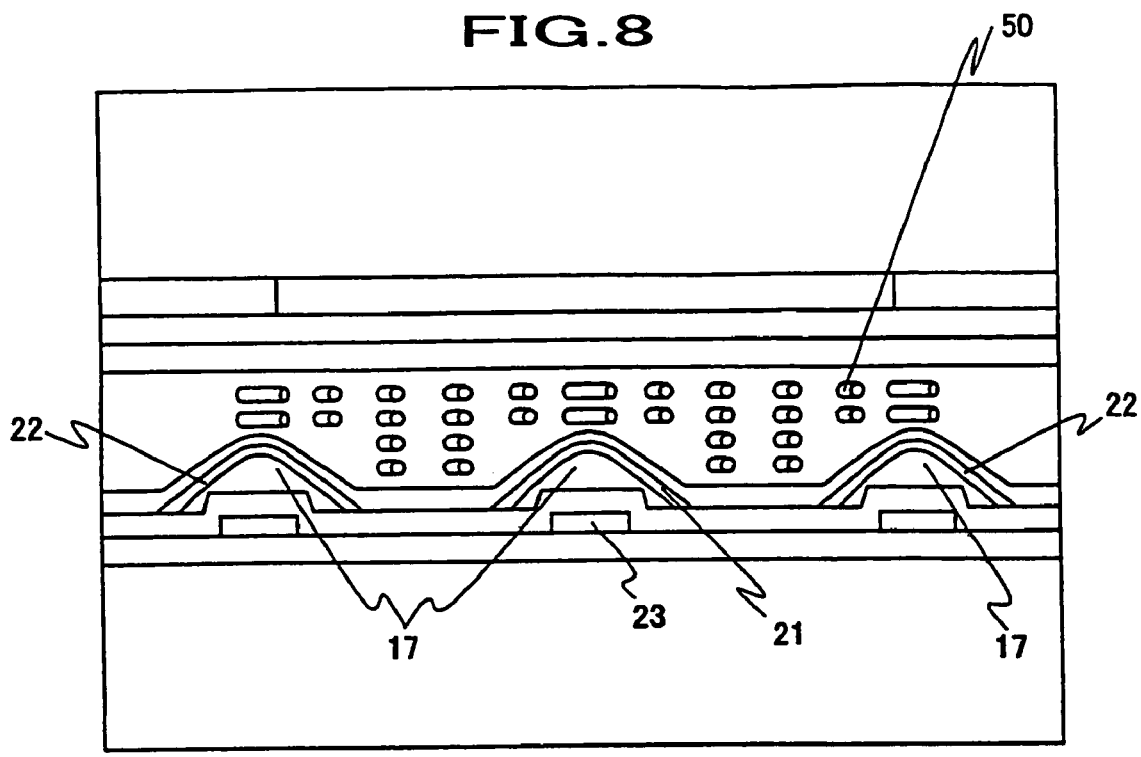
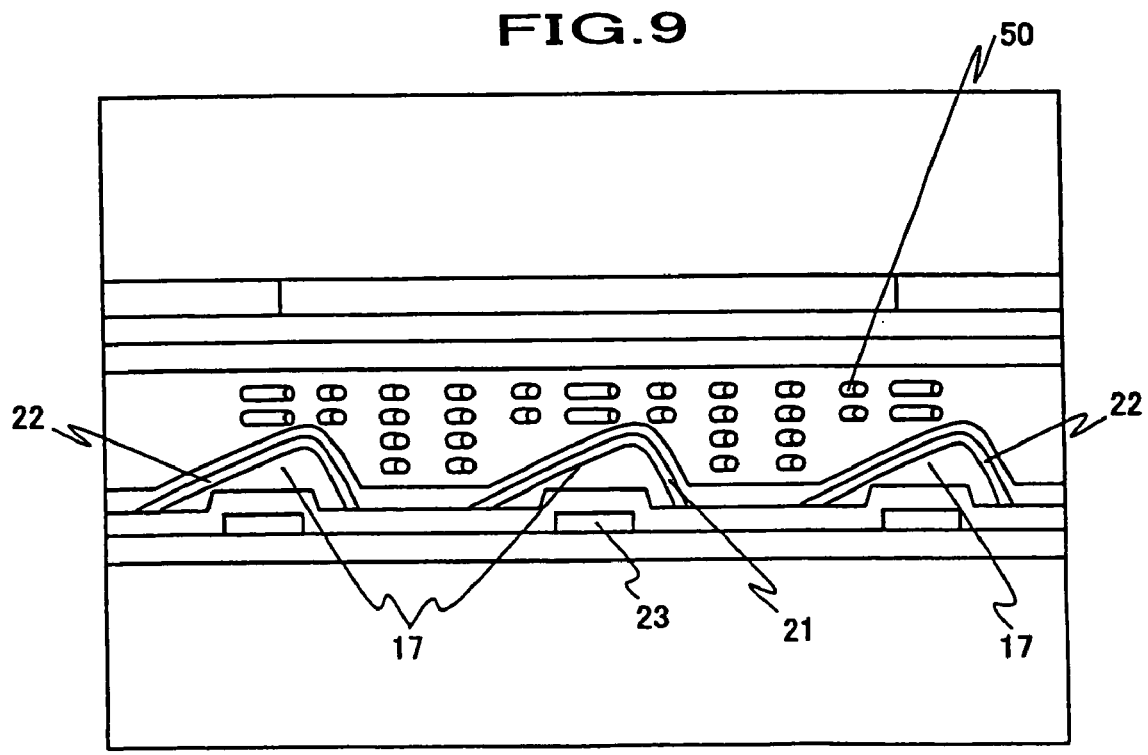

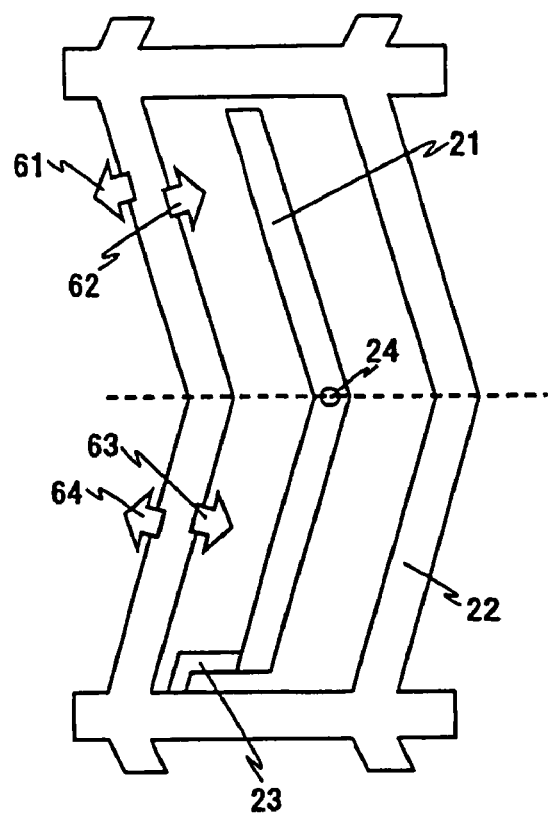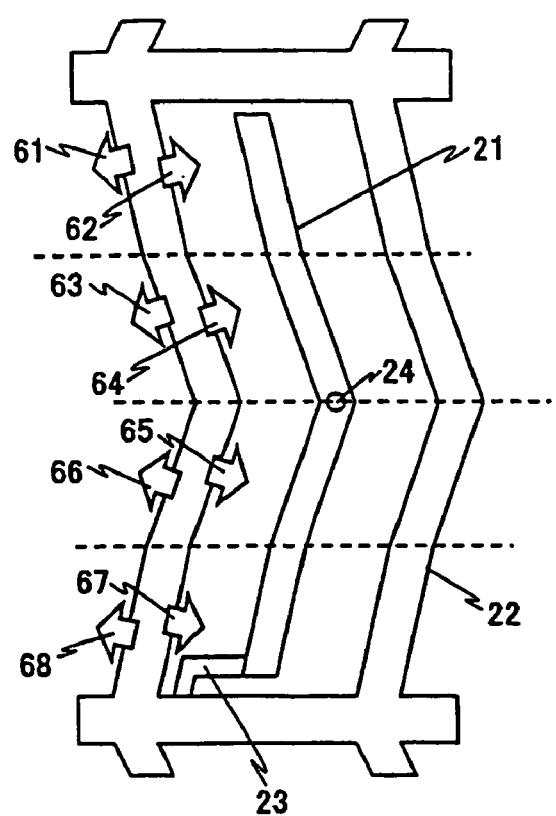

FIG.20A   FIG.20B   FIG.20C
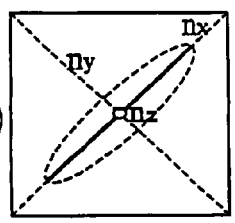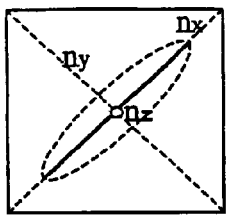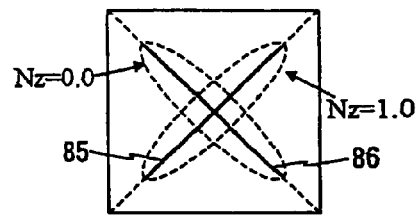
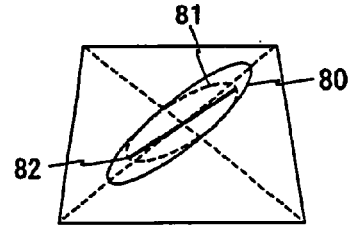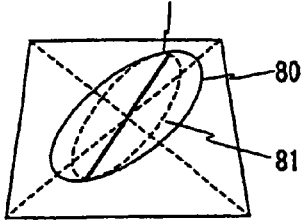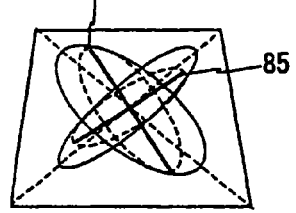
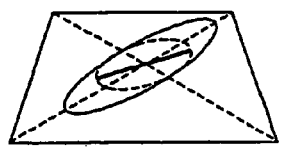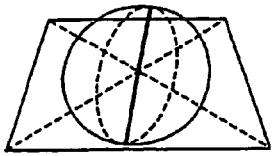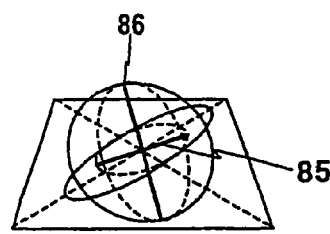
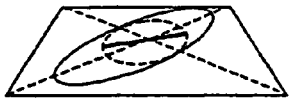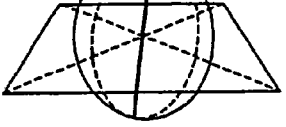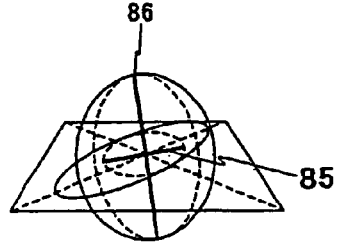

TRANSREFLECTIVE LIQUID CRYSTAL DISPLAY PANEL HAVING A WIDE VIEWING ANGLE

FIELD OF THE INVENTION

The present invention relates to a transflective liquid crystal display panel that has wide viewing angle.

BACKGROUND OF THE INVENTION

Transflective liquid crystal display panels that have schemes of wide viewing angle as well as IPS (In Plane Switching) and VA (Vertical Alignment) are now-a-day popularly used and being used for liquid crystal display TVs with additional improvement of moving picture characteristics. On the other hand, the liquid crystal display (called "LCD" hereinafter) has been widely used for portable information devices such as portable phones and digital cameras. The display panels for these portable information devices are simultaneously used by one person or a few persons and therefore wide viewing angle seems not to be necessary. However considering to the application of the digital cameras, wide viewing angle is still required since the monitoring is done from the view of slant back direction. For keeping privacy of the data monitoring, some people think wide viewing angle is not necessary for the portable device applications but their ideas imply the necessity to equip a certain baffle against a look of other persons but narrow viewing angle performanceis not required.

Since the displays used for the portable information devices are used in the sunny outdoors to in dark rooms, the display panels are desired to be transflective. The transflective liquid crystal display panels have a reflective display portion and a transmissive display portion in a pixel.

The reflective display portion reflects the incident lights from the circumferences by a reflection plate. Since the contrast ratio is constant regardless the ambient brightness, good display characteristics are obtained under rather bright conditions such as those from sunny outdoors to indoors.

Since back light unit is used for the transmissive display, high contrast ratio is obtained under rather dark conditions such as those from indoors to in-darkroom.

The transflective liquid crystal displays that have both reflective display panel portion and transmissive display panel portion serve for high contrast ratio under wide ambient conditions from sunny outdoors to in-darkrooms.

The conventional transflective liquid crystal has homogeneous alignment or twisted alignment of nematic phase in the liquid crystal layer to which a voltage is applied and an electric field in a direction normal to the substrate is generated. This principal drive operation is same as that of TN (Twisted Nematic) display panel. In order to improve the contrast ratio of the liquid crystal cell which has reflective layer therein, plural phase shift plates are used. Therefore, no sufficient viewing angle characteristics have been obtained.

A transflective display panel with wide viewing angle made by an improved technology such that the transflective configuration is applied to the IPS LCD which is known as wide viewing angle transmissive display panel, is described in the reference 1.

The pixel electrodes 21 are formed in stripes in the view from the normal direction against the substrate and each part of the electrode is linked within each pixel since IPS configuration uses the electric field which is directed in parallel to the substrate. The common electrode 22 is formed in the same configuration. These topological forms as alignment of the electrodes 21 and the common electrode 22 are called comb-like electrodes.

For example, the comb-like electrodes 21 and 22 function as reflective display panel portion by exploiting them as reflective electrodes and the gap 20 functions as reflective display panel portion. The traveling light passes the liquid crystal layer twice in the reflective display panel portion but once in the transmissive display panel portion. In order to remove the difference of light path lengths for both display panel schemes, the step differences are formed between the comb-like electrodes 21 and 22 and the transmissive display panel portion has twice thickness of the liquid crystal layer against the reflective display panel portion.

In this configuration, the comb-like electrodes 21 and 22 are projected from the substrate boundary surface. The cross sectional surface of the comb-like electrodes 21 and 22 have substantially square shapes in the cross sectional plane normal to the comb-like direction. Moreover, the retardation of the liquid crystal layer is adjusted to have quarter wave length at the reflective display panel portion by adding plural phase shift plates for the purpose of improving the contrast ratio at the reflective display panel portion.

In the inventions shown in the references 2 to 4, diffusive reflection electrodes which have micro corrugation surfaces on the comb-like electrodes are used.

Reference 1;
Published Japanese Patent Application, JP, H11-242226, A (1999)
Reference 2;
Published Japanese Patent Application, JP, 2002-139737, A (2002)
Reference 3;
Published Japanese Patent Application, JP, 2003-21824, A (2003)
Reference 4;
Published Japanese Patent Application, JP, 2003-21825, A (2003)

BRIEF SUMMARY OF INVENTION

In the conventional transmissive IPS LCD liquid crystal display panel, the liquid crystal molecule 50 present between the comb-like electrodes is mainly driven. Since the conventional comb-like electrodes 21 and 22 have flat top surfaces, the horizontal electric field which is a part of parallel component of the electric flux line to the substrate is quite week on the comb-like electrodes. Therefore the liquid crystal molecules 50 on the comb-like electrode hardly show nematic twists. The transflective IPS LCD which has the comb like electrodes 21 and 22 working as reflective display panel portion always shows "dark" display panel unless the liquid crystal molecule 50 shows the nematic twists and the reflective display panel is not possible.

Since no scattered reflection is taken place on the flat surface of the electrodes, the brightness of the reflected light sensed by the viewer becomes low. Therefore, the corrugation surface formed on the electrodes may work as scattered reflection electrodes. The pitch for the corrugation may have a resolution in the range of 5 to 10 micrometers due to the process limits of LCD manufacturing. Therefore, it is necessary that the width of the comb-like electrodes has to be widened if the plural corrugation patterns are formed on the surface of the electrodes. This widening of the pattern results into the reduction of the transmissive display panel portion provided the pitch of the reflective and transmissive display panel portions is kept in the same dimension. However the widening of the electrodes provides the reduction of LCD resolution and no such widening over the process limitation rule is allowed. Therefore the reflective display panel portion cannot have wide viewing angle and the apparent aperture for the reflective display panel operation is low as is.

As have been explained, the conventional transflective IPS LCD can hardly realize the reflection display panel. The technology of the present invention, however, enables to realize a new transflective IPS LCD that supports the reflective display panel capability.

DETAILED DISCRIPTION OF THE INVENTION

In order to realize the reflective display panel in the present invention, the cross sectional shape of the comb like electrodes is formed into a semi-ellipsoidal shape that is provided by the slope surface as well in stead or the rectangular shape which has been adopted for the conventional transflective IPS LCD. In this configuration, an electrical flux line is generated form the slope surface to the adjacent electrode which has another slope surface. As shown in FIG. 7, the horizontal electric field is generated mainly from the pattern edges of the comb like electrodes to which voltage is applied. Therefore, as shown in FIG. 6, it is possible to drive the liquid crystal molecules 50 on the comb like electrodes particularly at the portion of the pattern edge.

The cross sectional shape including the slope surface is formed, for example, by the organic insulator films which is underneath the comb like electrodes 21 and 22. The organic isolation film is melted when it is sintered. Then surface tension in the melting state is used to form the arc cross sectional shape. A high reflective metal layer such as aluminum layer is formed on the top surface of the arc cross sectional comb-like electrodes. By the photo engraving patterning, the aluminum patterns are selectively formed on the organic insulating layer.

Since the slope surface at the edge of the comb like electrodes 21 and 22 continuously varies, the pattern edge portions of the comb-like electrodes scatters and reflects the lights similar to those of corrugation surface. As shown in FIG. 4, the lights that incident to the comb like electrodes with a slant angle to the viewer who watches in the direction normal to the substrate is reflected to the viewer, therefore wide angle of lights are available for the viewer. This property provides high intensity of reflected lights for the viewer.

For the conventional transflective IPS LCD, the reflective display panel is not carried out due to two causes of problems; the liquid crystal does not show enough twist nematic and the viewing angle is narrow with no scattered reflection. Since these two shortenings are removed by using the comb like electrodes 21 and 22 which have arc cross sectional shape, the transflective IPS LCD of the present invention can support the reflective display panel.

Many people who use LCD display panels take views of the display panel in the direction normal to the substrate. The curved slant surfaces of the comb-like electrodes can reflect the lights coming in the range of the angle covering the normal direction to low angle direction against the horizontal direction. If the directions of the comb like electrodes 21 and 22 are constant, the direction normal to the substrate is constant therefore the reflection characteristics show a strong directivity. The strong directivity in the reflection provides preferable display panel characteristics for a specific operation condition.

On the other hand, good display panel characteristics for various circumferences are obtained without depending on the operation conditions if the directivity is suppressed. In the present invention, azimuthal distribution of directional characteristic is given to the reflection in the direction normal to the reflection surface of the substrates. More concretely the pattern of the comb like electrodes 21 and 22 are bended, the widths of the electrodes periodically or non-periodically vary in repeating fashion, or micro corrugation is formed on the comb like electrodes. Then the directivity is suppressed and isotropic reflectivity is obtained.

The distribution of the comb like electrodes 21 and 22 is within a certain rule, interferences in the reflected light are generated and the white lights tend to be segregated into several colors like as a rainbow. When the scattered reflective surfaces are set in facing or in turning away, the reflected light has less interference with the incident lights to the comb like electrodes 21 and 22. More concretely, the adjacent pixel electrodes 21 are formed in different planer shapes from the common electrodes 22. In addition, the corrugation planar pattern of the electrodes 21 and 22 or corrugated electrode surfaces are effective and non-periodical patterning or surface forming of the electrodes can be adopted for the reduction of the interference. By these counter measures, the effect of the suppression of interference is obtained as well as the suppression of the isotropic characteristics of the reflected lights.

As have been discussing, the present invention can provide transflective IPS LCD which has various reflection characteristics of the reflective display panel and transmissive display panel. The transflective IPS LCD of the present invention is usable in various circumferences from the sunny outdoor to in-darkroom and provide wide viewing angle of the transmissive display panel characteristics as wide as monitor display panel.

Therefore, the high picture quality display panel similar to the monitor display panel is available as a portable device and enables to handle the high fidelity and resolution image information. When such LCD is used for digital cameras, the confirmation and checking of the acquired image display panel becomes easy. In addition, high quality image information is reproduced without the limitation of place to check if this display panel is applied to the portable TVs as surface wave digital TV becomes popular under the expectation that TV signal distribution environment for the receivers will be remarkably improved.

BRIEF DESCRIPTION OF THE DRAWINGS

FIG. 1A is a schematic that shows the first embodiment of the present invention, especially the patterning of the pixel electrode 21 and the common electrode 22.

FIG. 1B is a schematic that shows the first embodiment of the present invention, especially the patterning of the scanning line 27, signal line 25, the thin film transistor 28 and the pixel electrode 21.

FIG. 2 is a schematic that shows the first embodiment of the present invention, especially a cross sectional view cut in the line II-II in FIG. 1A.

FIG. 8 is a schematic that shows the cross sectional view of the orientation of twist nematic generated in the liquid crystal molecule 50 in case of voltage applied regarding the second embodiment of the present invention.

FIG. 9 is a schematic that shows the cross sectional view of the orientation of twist nematic generated in the liquid crystal molecule 50 in case of voltage applied regarding the third embodiment of the present invention.

FIG. 10A is a schematic that shows the fourth embodiment of the present invention, especially the patterning of the pixel electrode 21 and the common electrode 22.

FIG. 10B is a schematic that shows the fifth embodiment of the present invention, especially the patterning of the pixel electrode 21 and the common electrode 22.

FIGS. 20A-20C is a schematic that shows the cross sectional formation of the index ellipsoid in accordance to increasing of polar angle.

DETAILED DISCRIPTION OF THE INVENTION

Figure 3A:
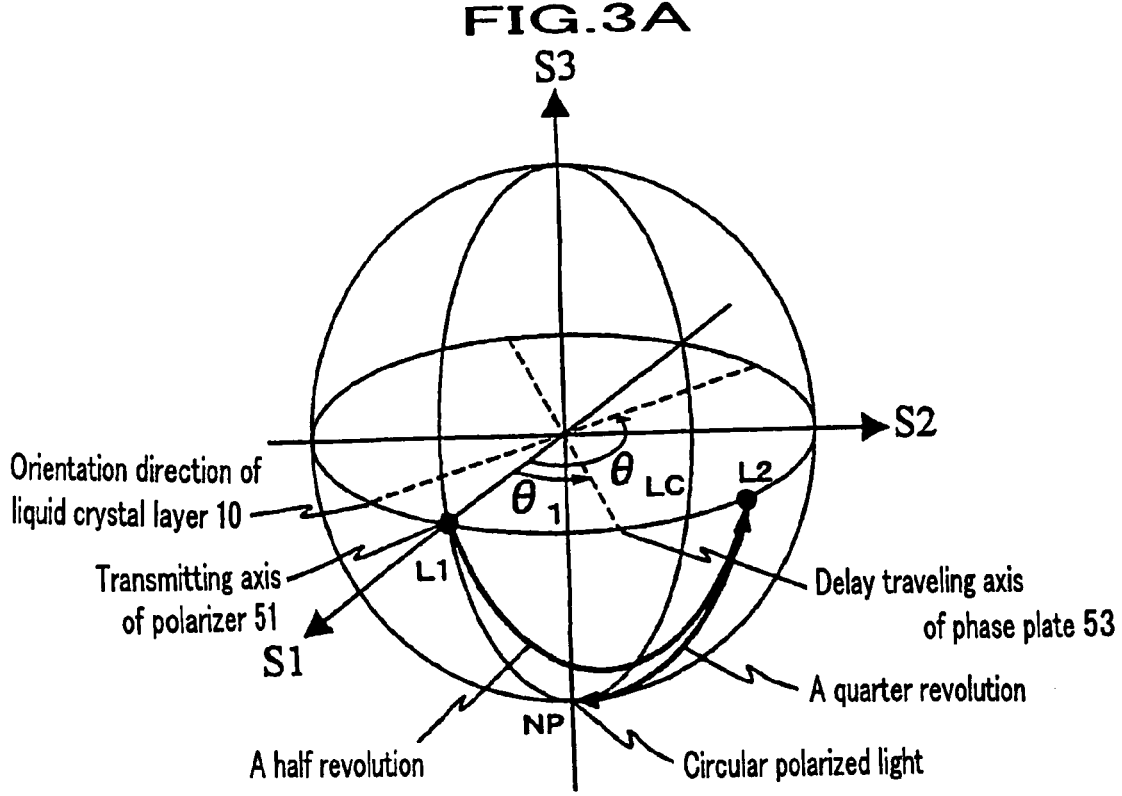
FIGS. 3A and 3B is a schematic that shows the optical relation of the first phase plate 53 and the orientation of liquid crystal layer of reflective LCD of the first embodiment of the present invention.

The details of the present invention will be explained using the following embodiments.

First Embodiment

The cross sectional view of the present LCD panel is shown in FIG. 2 and the top view of the second substrate 12 is shown in FIG. 1. FIG. 2 shows a cut view in the dotted line II-II shown in FIG. 1. and the first substrate 11 and the second substrate 12 suspend the liquid crystal layer 10 therebetween. The first substrate 11 has an alignment layer 13, leveling layer 19 and the color filter 18 in the side adjacent to the liquid crystal layer 10.

FIG. 1A shows the pattern of the common electrode 22 on the second substrate 12 and FIG. 1B shows the layer pattern underneath the electrode 22. The second substrate 12 has the second alignment layer 13 in the side close to the liquid crystal layer 10 and has thin film transistor 28. The thin film transistor 28 has the construction of anti-stager and the channel is made of the amorphous silicon layer 26.

The scanning lines 27 and the signal lines 25 are crossing and the thin film transistor 28 locates thereon. The thin film transistor 28 is connected to a scanning line 27, the signal line 25 and the source line 23. The scanning line 27 and the signal line 25 are isolated by the first isolation layer 15 and the signal. The signal line 25 and the pixel electrode 21 which works to apply voltage thereby are isolated by the second isolation layer 16 and the third insulation layer 17. The pixel electrode 21 which works to apply voltage thereby and the signal lines 25 are aligned in parallel and the source line 23 is connected to the source of the thin film transistor 28. The pixel electrode 21 and the source line 23 connected to the thin film transistor 28 are connected via through hole 24. There is the second alignment layer 14 on the pixel electrode 21 and the alignment direction is prescribed by the closeness of the liquid layer 10.

The first substrate is made of borosilicate glasses. The thickness is 0.5 mm. The color filters 18 are repeatedly aligned in stripes that have of red, green and blue. The wavy surface due to the presence of the color filters is made planar by the leveling layer 19. The first alignment layer 13 is made of the polyimide and the layer thickness is 0.2 micrometers.

The second substrate is made of borosilicate glasses and the thickness is 0.5 mm. The second alignment layer 14 is an organic layer that has the director property. The scanning line 27 and the signal line 25 are made of chrome and the first and the second isolation layers 15 and 16 are silicon nitride and the third isolation layer 17 is organic film. The pixel electrode 21 and the common electrode 22 are made of aluminum and the thickness is 0.14 micro meters. The pixel electrode 21 and the common electrode 22 have comb like patterns and facing each other. When voltage is applied between the pixel electrode 21 and the common electrode 22, then the lateral electric field is generated.

The isolation layer 17 works as an insulation layer both for the pixel electrode 21 and the common electrode 22 which are formed on the isolation layer 17. The isolation layer 17 is made by an organic film patterned to be similar to the patterns of the pixel electrode 21 and the common electrode 22.

In the process of sintering, the patterned organic film is melted and the surface tension keeps the shape so that the cross sectional pattern becomes the quadrate symmetric.

The pixel electrode 21 and the common electrode 22 formed by high reflective aluminum, the portion where the pixel electrode 21 and the common electrode 22 are presented to work as the reflective display. The gap between the pixel electrode 21 and the common electrode 22 is transparent and works as the transmissive display portion since the backlight passes therethrough. The pixel electrode 21 and the common electrode 22 are patterned on the isolation layer 17 project from the surface of the second substrate 12. Therefore the thickness of liquid crystal layer of the reflective display portion is smaller than that of the transmissive display portion.

The pixel electrode 21 and the common electrode 22 are patterned to completely cover the quadratic cross section pattern. The thickness of the liquid crystal layer on the reflective display portion is set to be smaller than that of the transmissive display portion and the thickness of the liquid crystal layer of the transmissive display portion is approximately constant. The thickness of the crystal layer cannot be constant since the third isolation layer 17 has the quadrate cross section. The average thickness is as the thickness of the liquid crystal layer of the transmissive display portion is about 1.7 to 1.9 times larger than the average thickness for the liquid crystal layer of the reflective display portion.

As discussed above, the thickness of the liquid crystal layer of the transmissive display portion is necessary to be 2 times larger than the thickness for the liquid crystal layer of the reflective display portion in order to remove the optical path length at the reflective display portion and the transmissive display portion. Since the retardation in the liquid crystal layer of the reflective display portion is a quarter wave length, the retardation of the liquid crystal layer of the transmissive display should be twice of such retardation which is a half wave length. It is possible to obtain the maximum intensity of the transmissive display light when the retardation of the thickness of the liquid crystal at the transmissive display portion is set a half wave length but the displayed light color turns to be yellow rich.

In order to keep the substantially maximum light intensity, the thickness of the liquid crystal layer of the transmissive display portion is set to be about 1.7 to 1.9 times larger than the average thickness for the liquid crystal layer of the reflective display portion.

Considering the third isolation layer 17, the portion covered by the pixel electrode 21 and the common electrode 22 are reflective display portions and the rest portions are the transmissive display portions. Once the pixel electrode 21 and the common electrodes 22 completely cover the third isolation layer 17, all of the third isolation layer 17 works as reflective display portion. The transmissive display portion is only between the electrodes. Since the portion between the electrodes is flat, the thickness of the liquid crystal layer of the transmissive display portion is constant. When the pixel electrode 21 and the common electrode 22 partly covers the third isolation layer 17, the thickness of the liquid crystal layer of the transmissive display portion may not be constant since the parts (edge portions) of the third isolation layer 17 work as the transmissive display portion.

Therefore, it is possible to prioritize the transmissive display quality by keeping the thickness of the liquid crystal layer of the transmissive display portion constant in the design in the present embodiment which adopts the IPS LCS that enables to provide wide viewing angle performance in the transmissive display resulting into improvement to provide good viewing perception. By this design, the contrast ratio of the transmissive display can be increased due to improving the shut-off in the "dark" transmission.

For the liquid crystal material in the liquid crystal layer 10, a fluoro liquid crystal compound which shows positive anisotropic dielectricity. The birefringence of the compound is 0.073 and has nematic property in a wide temperature range. Since the compound has high resistivity, the nematic is maintained after voltage is applied during even shutting-off of the power by the thin film transistor 28, that results in satisfactory reflected light intensity and transmitted light intensity.

The first alignment layer is made by sintering Sun Ever (of Nissan Chemical Industries, Ltd.) after coating and the alignment process is done by rubbing method. The second alignment layer 14 is coated on the second substrate 12 and then is hardened by ultra-violet light. There is a step difference of 1.5 micro meters between the reflective display portion and the transmissive display portion and therefore the rubbing method cannot be sufficient in alignment process at the region of such step difference. By using the organic film that has light alignment capability for the second alignment layer 14, it is possible to apply the alignment process at the step region and therefore the alignment process over the second substrate 12 is homogenously obtained. The orientation of the first alignment layer 13 and the second alignment layer 14 is set in a way that the liquid crystal material is injected and sealed off after assembling the fist substrate 11 and the second substrate 12, the resultant LCD panel has a homogenous alignment of the liquid crystal layer and the alignment direction has the 75 degrees against the electric fields between the pixel electrode 21 and the common electrode 22.

We will call the first substrate 11 and the second substrate 12 of the LCD panel as the upper substrate and the lower substrate, respectively. The lower substrate has pixel electrodes 21 and common electrodes 22 which reflect the incident lights since the lower substrate locates the lower position viewed by the viewer in the usual usages. The upper substrate has the first phase plate 53 and the first polarizer 51 from the order close to the upper substrate. Under the lower substrate of the LCD panel, there are the second phase plate 54, the third phase plate 55 and the second polarizer 52.

The thickness of the liquid crystal layer of the reflective display portion is not constant and therefore the behavior of the average light in total has to be considered for the design. The "dark" display is given by a homogenous alignment of the liquid crystal in the pixel at no voltage supplied in the transmissive IPS LCD panel. This is true for the transflective IPS LCD panel. For the "dark" display, the circular polarization of the incident lights to the pixel electrodes 21 or the common electrodes 22 are converted into linearly polarized lights at the polarizer 51 after being reflected. By this optical mechanism, the "dark" display is sufficiently obtained by suppressing the reflection by means of the cut-off of the light done at the first polarizer 51. Since this suppression of the reflected lights by the first polarizer is possible for wide range of the visible lights, the present invention can provides the cut-off of the white lights without generating achromatic light that support sufficient "dark" reflection.

The optical design condition for the first polarizer 51, the fist phase plate 53 and the reflective display portion is determined to satisfy the above requirements. The optical design condition can be determined using the concepts of Poincaré sphere, which is defined by Stokes parameters (S1, S2, S3) for the space. According to Poincaré sphere, the crossing line with the plane (S1, S2) which is on the equator on Poincaré sphere corresponds to the linear polaraization and the cross points with the S3 which are North pole and South pole thereon correspond to circular polarization. The rest corresponds to the ellipsoidal polarization. These parameters have the flowing relation with the electric fields of the polarized lights and the phase difference δ or right rotation polarization phase and the left rotation polarization phase as;

$$S1=(Ex^2-Ey^2)/(Ex^2+Ey^2)$$

$$S2=2ExEy\cdot\cos\delta/(Ex^2+Ey^2)$$

$$S3=2ExEy\cdot\sin\delta/(Ex^2+Ey^2)$$

The conversion of polarization of the phase plate and the polarization twist is presented by the rotation around in the (S1, S2) plane with the rotation line which pass through the center of the Poincaré sphere. The rotation angle is that of the half revolution if the retardation of the phase plate is ½ wave length and that of the quarter revolution if the retardation of the phase plate is ¼ wave.

The light traveling process is considered for the case that the incident light has the typical wave length of the visible lights (for example, 550 nm wherein the human eyes has the maximum viewing perception) passes the first polarizer 51, the first phase plate 53 and the reflective display portion and finally arrives at the pixel electrode 21 or the common electrode 22.

As has shown in FIG. 3A, the incident light which is linearly polarized light by the first polarizer 51 is presented by a position on the equator of Poincaré sphere. The position moves to the point L2 with a half revolution on the equator by passing the first phase plate 53 and further moves to North pole NP with a quarter rotation along the longitude by passing the liquid crystal layer.

For the incident lights which have the different wave lengths from the above lights, the retardation has the wavelength dependence. The retardation due to the phase plate and the liquid crystal layer is relatively large for the short wavelength and is relatively small for the long wavelength. Since the revolution or the rotation is different according to the wave length, the revolution by the first phase plate 53 is not a half revolution for the light which has the wave length other than 550 nm and deviates from the equator.

More concretely, the retardation of the blue light is larger than ½ wave length and therefore the rotation is more than a half rotation and the position deviates from the equator. The retardation of the red light is smaller than ½ wave length and therefore the rotation is less than ½ rotation and the position deviates from the equator as well. However the quarter rotation due to passing the liquid crystal layer has substantially reverse moving direction and therefore the rotational angle due to the different wavelength light is compensated. As the result, the light position on Poincaré sphere comes to about North pole NP and the light of each wavelength becomes about the same circular polarized light. For this polarization property of the visible lights, the displayed light by the liquid crystal display panel of the present invention and wide range of visible wavelength light can have a clear and achromatic cut-off characteristic.

The effects of the first phase plate 53 and the liquid crystal layer of the reflective display portion are a half revolution and a quarter rotation along the longitude, respectively, and therefore the first phase plate 53 and the retardation of the reflective liquid crystal layer are ½ wave length and ¼ wave length, respectively as well. The axis of the revolution corresponds to the orientation of the axis of the retardation and the orientation angle $\theta_{PH1}$ of the first phase plate 53 and the orientation of the reflective display liquid crystal layer $\theta_{LC}$ can be defined in anti-clockwise with assumption that the orientation of the transmissive axis of the first polarizer 51 be zero as;

$$2\theta_{PH1}=225°+\theta_{LC} \quad (1)$$

Figure 3B:
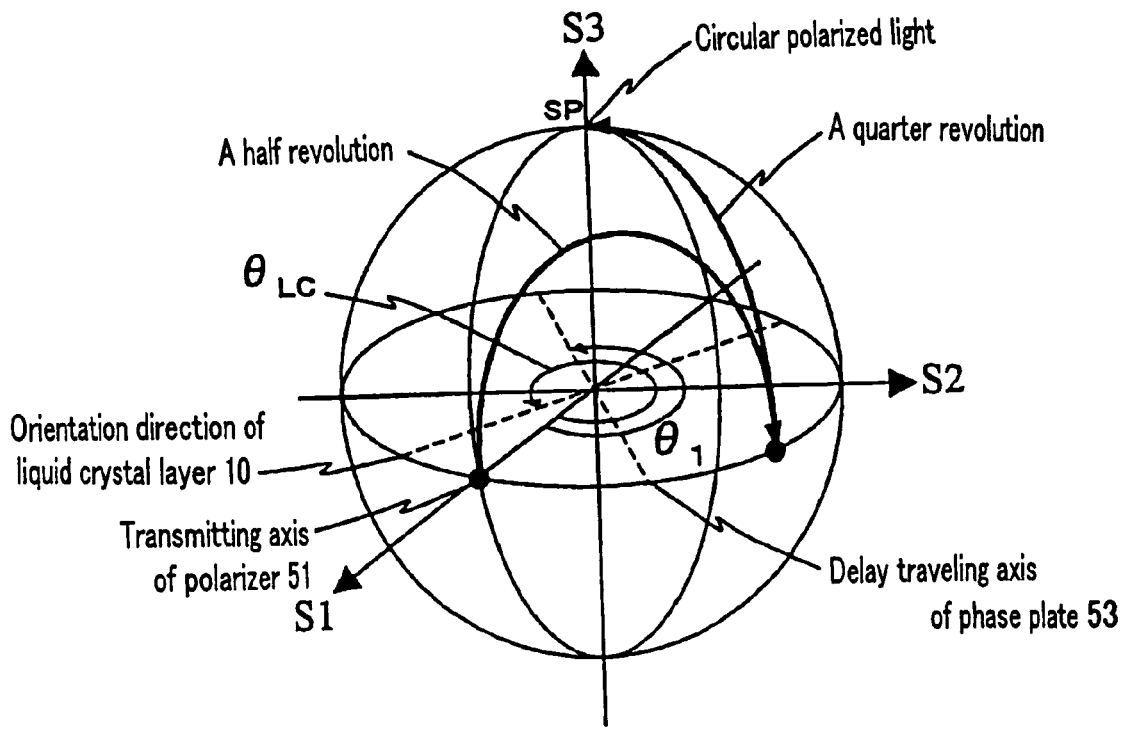
Figure 4:
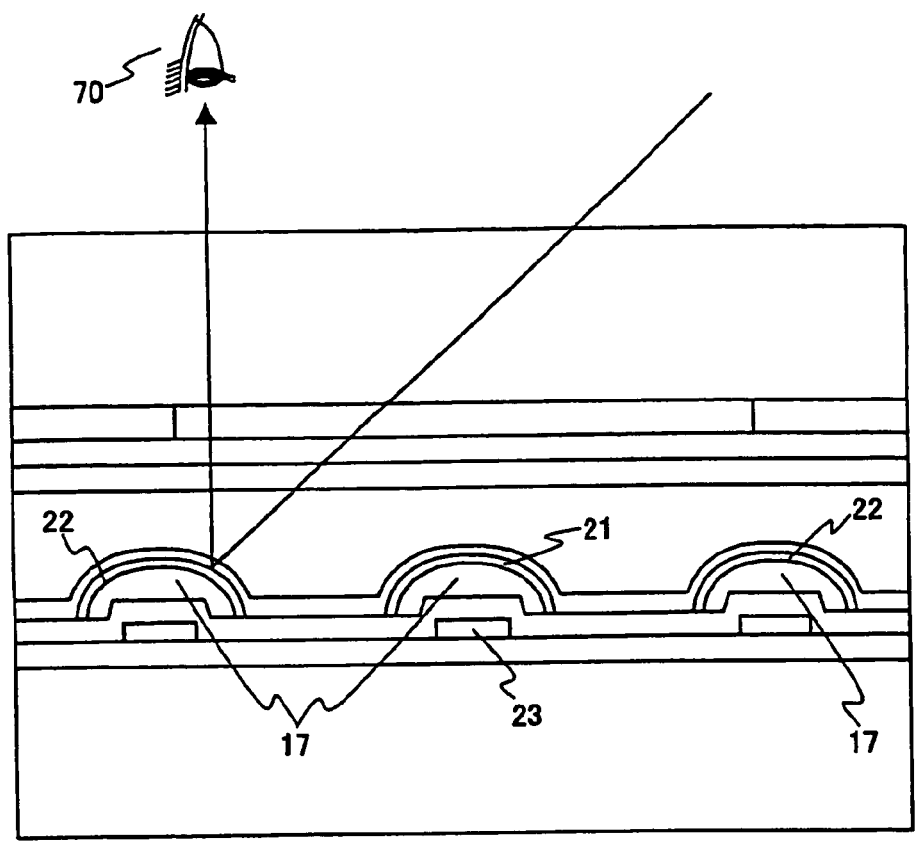
FIG. 4 is a schematic that shows the relation of the incidental light, reflected light and a viewer regarding the first embodiment of the present invention.

As shown in FIG. 3B, the position of each incident light on Poincaré sphere can be about at South Pole. For this case, the first phase plate 53 and the retardation of the reflective liquid crystal layer are ½ wave length and ¼ wave length, respectively. The orientations $\theta_{PH1}$ and $\theta_{LC}$ are given by the following equations;

$$2\theta_{PH1}=-45°+\theta_{LC} \quad (2)$$

where, $\theta_{PH1}=15°$ and $\theta_{LC}=75°$ are used in the present embodiment.

The optical conditions for the second phase plate 54, the third phase plate 52 and the second polarizer 52 are determined as follows. The second phase plate 54, the third phase plate 52 and the second polarizer 52 are considered as a pair of transmissive display portion, the first phase plate 53 and the first polarizer 51. The second phase plate 54 pair is regarded as the liquid crystal layer of the transmissive display portion and not the reflective display portion because the incident light does not pass the second phase plate 54 or the rest paths in the reflective display portion but pass the second phase plate 54 and the rest paths only in the transmissive display portion.

The retardation of the second phase plate 54 should be same as the retardation of the transmissive display portion which is paired with and the retardation axis is set to be right angle to the orientation (which is same as the liquid crystal layer of the reflective display portion) of the liquid crystal layer of the transmissive display portion. By this setting, the retardations of the second phase plate 54 and the transmissive display portion are mutually cancelled.

The retardation of the third phase plate 55 is set to be same as that of the first phase plate 53 which is paired with and the retardation axis is set to be right angle to the retardation axis of the fist phase late 53. By this setting, the retardations of the third phase plate 55 and the retardation of the first phase shift 53 are mutually cancelled. The transmissive axis of the second phase plate 52 is set to be right angle to the transmissive axis of the first phase plate 51.

In this embodiment, $\theta_{PH}=165°$, $\theta_{PH3}=105°$ and $\theta_{PL2}=90°$ are used and the retardations of the second polarizer 52 and the first polarizer 51 are set as a half wave length. Since the retardations of two pairs of birefringent media which are placed between the second phase plate 52 and the first phase plate 51 are mutually cancelled, the second polarizer 52 and the first polarizer 51 have the relation of equi-phase. The idealistic "dark" display is realized in the normal direction by orthogonalizing the polarity of the second polarizer 52 against the polarity of the first polarizer 51.

The optical conditions as determined above the first phase plate 53 and the first polarizer 51 are piled up above the liquid crystal panel and the second phase plate 54 and the third phase plate 55 are piled up beneath the liquid crystal panel.

The light diffusion layer 56 is formed in such a construction that many transparent micro balls of which refractive index is different from the adhesive layer which keeps the contact between the first phase plate 52 and the substrate 11. By using the refraction effect at the boundaries between the adhesive layer and the micro balls, the incident lights divert in cascade manner at the boundaries. The light diffusion layer 56 suppresses the interference between the lights reflected by the pixel electrode 21 and the common electrode 22 and color intensifying due to the interference is reduced.

Figure 5:
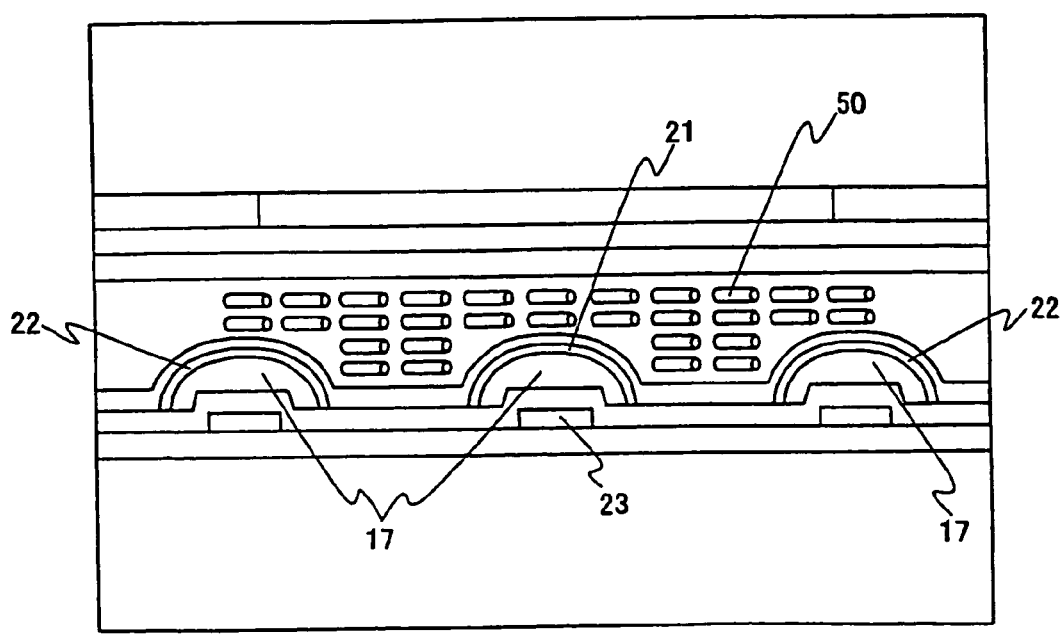
FIG. 5 is a schematic that shows the orientation of twist nematic of the liquid crystal molecule in case of no voltage applied regarding the first embodiment of the present invention.
Figure 6:
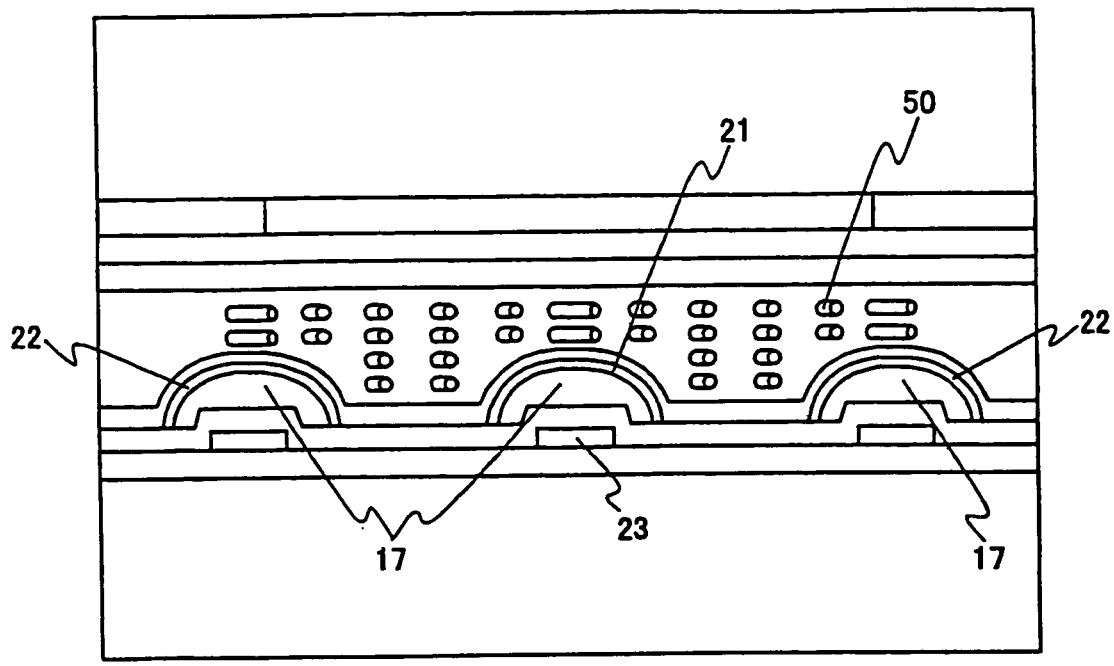
FIG. 6 is a schematic that shows the orientation of twist nematic of the liquid crystal molecule in case of voltage applied regarding the first embodiment of the present invention.
Figure 7:
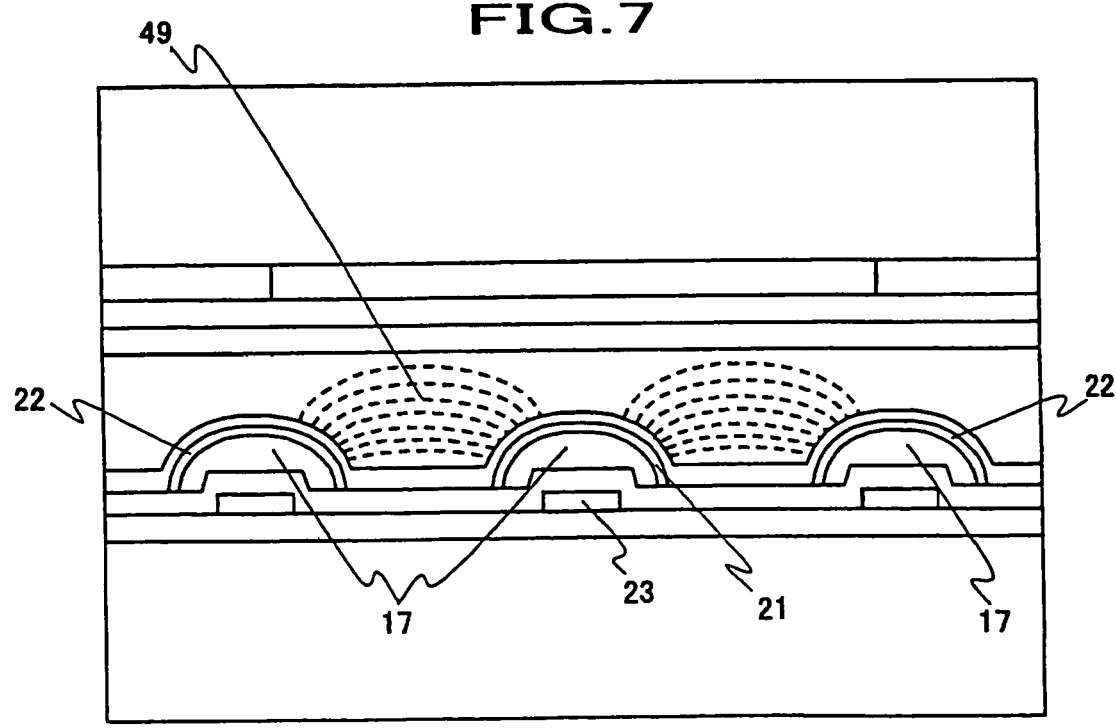
FIG. 7 is a schematic that shows the electric flux lines 49 in case of no voltage applied regarding the first embodiment of the present invention.

FIG. 4 to FIG. 7 show the transflective IPS LCD panel which is designed in the condition described above. FIG. 5 is the cross section that shows the orientation of the liquid crystal 50 with no voltage applied and FIG. 6 is the cross section that shows the orientation of the liquid crystal 50 with voltage applied. FIG. 7 is the cross section that shows the electric fluxes when voltage is applied.

The transflective IPS LCD panel of the present embodiment is combined with a drive circuit and a backlight unit for operation. The reflective display capability is obtained in the day light environment with the backlight turned off and the transmissive display capability is obtained in the dark room environment with the backlight turned on. The transflective IPS LCD panel of the present embodiment is designed to function in both schemes as reflective display and transmissive display.

The cross sectional formations of the pixel electrode 21 and the common electrode 22 are substantially same. The incident lights coming from the right hand side and the left hand side are reflected in the same degree. Therefore less directional dependency of the reflection is obtained.

Figure 18A:
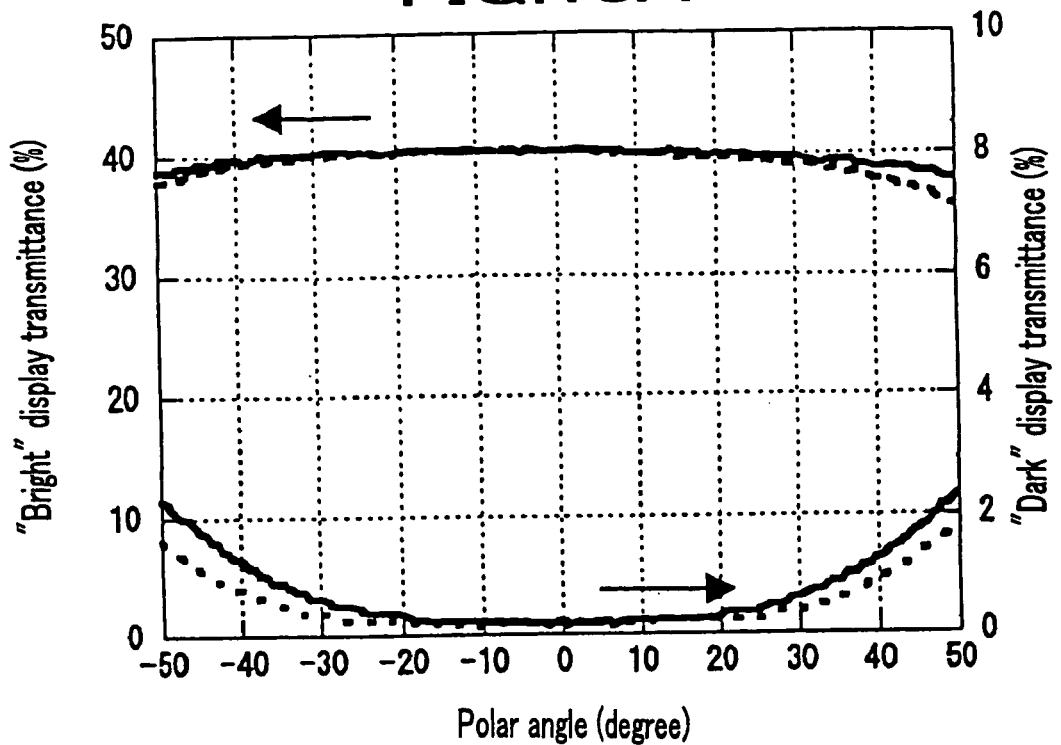
FIG. 18A and FIG. 18B are schematics that show the viewing angle characteristics of the transmissive display panel of the liquid display panel regarding the present invention.

FIG. 18A shows the viewing angle characteristics in the transmissive display of the transflective IPS LCD panel of the present embodiment. FIG. 18A shows the polar angle dependence of the first polarizer in the parallel (a solid line) and normal (a dotted line) directions to the polarization direction. The polar angle 0 degree is the direction that coincides with normal direction of the substrates 11 and 12. The polar angle increases with deviation from the normal direction. The transmission rate regarding "dark" display is almost constant within ±20 degrees in the polar angle for either polarization directions, which shows the improved effect of the IPS scheme.

The construction of the pixel of the liquid crystal panel in the present invention is no confined in that shown in FIG. 1.

For example, the configuration that the common line 29 is aligned in parallel to the scanning line 27 and the common electrode 21 is connected to the common line 29 via through hole 24 may be covered by the present invention. The construction of the pixel shown in FIG. 14A seems more complicate than that shown in FIG. 1, but there is an advantage that the construction provides less failures due to the line break since each electrode is connected to the common line formed on a flat substrate.

Figure 14A:
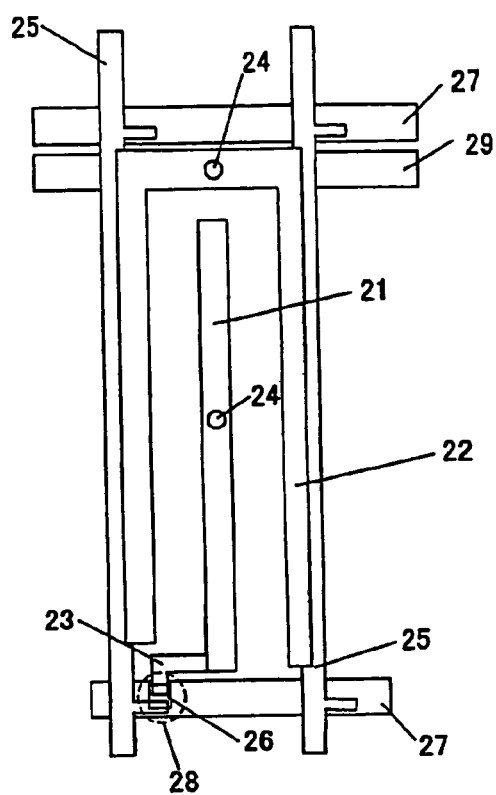
FIG. 14A is a schematic that shows a patterning of the common electrode 22 and pixel electrode 21 of the pixel configuration with a common line 29.
Figure 14B:
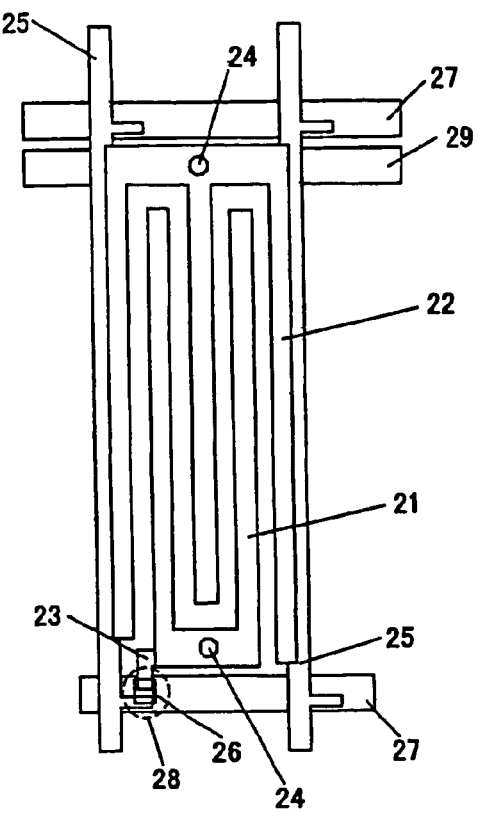
FIG. 14B is a schematic that shows another variation of the patterning of the common electrode 22 and pixel electrode 21 of the pixel configuration with a common line 29.
Figure 14C:
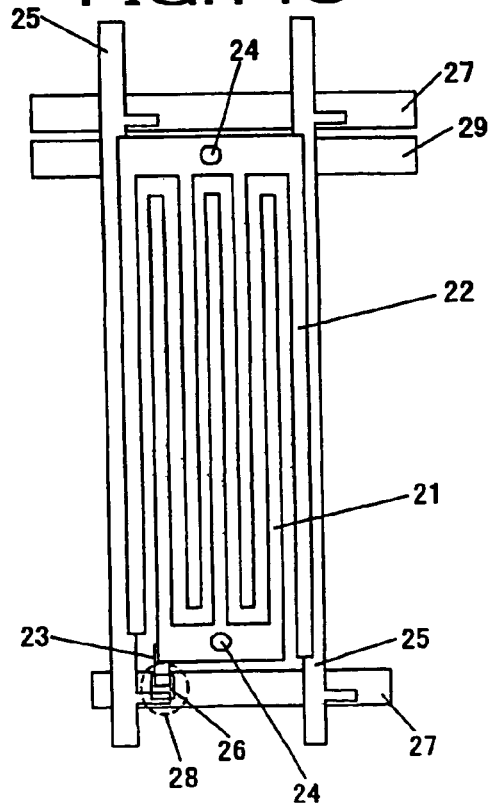
FIG. 14C is a schematic that shows further patterning of the common electrode 22 and pixel electrode 21 of the pixel configuration with a common line 29.

FIG. 1 and FIG. 14A show that two common electrodes and one pixel electrode are placed in each pixel. However another configuration as shown in FIG. 14B such that three common electrodes and two pixel electrodes are placed in each pixel or the other configuration as shown in FIG. 14C such that four or more common electrodes and three or more pixel electrodes are placed in each pixel may be adopted.

The aperture rate of the LCD panel, drive voltage and response time depends on the gap between the common electrode and the pixel electrode. For example, by optimizing the quantities of the common electrodes and the pixel electrodes against the dimension of the pixel, the optimum design that provides sufficient display characteristics is possible. In the present invention, the simplified pixel construction as shown in FIG. 1 is explained in detail.

Second Embodiment

FIG. 8 shows another embodiment of the present invention wherein the pixel electrode 21 and the common electrode 22 have the different cross sectional form by which the reflection characteristics are improved. The cross section of the pixel electrode 21 and the common electrode 22 is symmetry, which is same as the embodiment 1. The flat area is relatively reduced in comparison to the embodiment 1 and the slope area is increased.

The pixel electrode 21 and the common electrode 22 are made in the flowing method. The insulator 17 is patterned by using a grating mask which enables to progressively adjust exposure. The exposure is fully done onto the gaps between comb like electrodes and the insulation film is completely removed. The edge portions of the comb like electrodes 21 and 22 are incompletely exposed and rather thin insulation film is left. Since the central area of the comb like electrodes 21 and 22 is not exposed, the rather thick insulation film is left. The left insulation film is sintered to be melted and the slope area is increased at the edge portion and the slope angle becomes gentle.

Other than this embodiment, an additional organic insulating film is formed selectively to the central planar areas of the pixel electrodes and the common electrodes. By melting this film in sintering, the slope area increases more than the slope area of the pixel electrode 21 and the common electrode 22 which are obtained in the embodiment 1.

By increasing the area of the slope more than that shown in the embodiment 1, the lateral electric field on the pixel electrode 21 and the common electrode 22 becomes large and the orientation of the liquid crystal largely varies when voltage is applied. In addition the rate of the reflective scattering to the normal direction of the incident light with a slant angle to the panel is increased and brighter reflective display is obtained. The cross section of the pixel electrode 21 and the common electrode 22 is substantially symmetric and the less variation of the reflectivity against the incident direction as well as the first embodiment.

Third Embodiment

As shown in FIG. 9, the cross section of the pixel electrode 21 and the common electrode 22 is formed in asymmetric. The decrease of the flat surface is same as the second embodiment but the flat portion is not on the central portion of the pixel electrode 21 and the common electrode 22.

The asymmetric cross section is formed in the following manufacturing process. By using grating mask as well as the second embodiment, the deviated portion on the comb like electrodes 21 and 22 is not exposed and thick insulation film is left. Other than this process, an additional organic insulating film is formed selectively to the central areas and the film is melted into the similar shape of the cross section.

According to the asymmetric shape of the cross section, higher rate of reflective scattering toward the normal direction for the incident lights from the slant direction of the one side of the cross section than the conventional LCD panel. The display even in the bright circumference is realized, especially, the incident light from a particular direction shows the sufficient reflection display.

Fourth Embodiment

The embodiments shown in FIG. 10 to FIG. 13 have less directivity of the reflective display. More concretely, sufficient reflective display is obtained by improving the construction of the comb like electrodes. The comb like electrodes are aligned to a certain direction, the reflection has directivity. In order to remove this directivity, the direction of the comb like electrode is made to have variety even in a pixel. One of the methods to make this variety is that the whole of the comb like electrode has a bending shape, a corrugated surface on the electrode or the combination of both the bending shape and the corrugation surface.

As shown in FIG. 10A, the present embodiment adopts a variation that the teeth shape of the comb like electrodes is bended. The comb like electrode in the first embodiment is vertical to the scanning line. In this embodiment, the comb like electrodes 21 and 22 have the letter "V" shape and the teeth shape of the comb like electrodes has non-vertical angle. The angle of the comb like electrodes 21 and 22 against the scanning line is defined to be 0 degree when the comb like electrodes are vertical to the scanning line and the angle rotates in anti-clock wise for the positive angle. The upper half and the lower half of FIG. 10A is called the region 1 and the region 2, respectively. Then the angles to the electrodes 21 or 22 in the region 1 and the region 2 are 20 degrees and −20 degrees, respectively. By this structure, the directions of the slope area of the comb like electrode become four directions (61 to 64) in comparison to two directions as shown in the first embodiment. Therefore the directivity of the reflection is reduced and becomes close to isotropic directivity which is preferred display characteristics since the sufficient display is provided for various circumference conditions.

Due to the reduction of the directivity of the reflection characteristics, the light diffusion layer 56 may have less diffusivity. When the light diffusion layer 56 is placed between the first substrate 11 and the first phase plate 53, the light diffusion layer 56 and the pixel electrode 21 are isolated by the first substrate 11. Since the incident light is widely scattered in cascade manner for farther than the size of the pixel, the resolution may reduce in depending upon circumference of usage for the conventional technologies. However the degradation of the resolution can be suppressed since the present invention can adopt a low diffusive light diffusion layer.

A drive circuit unit is attached to the transflective IPS LCD panel as explained above and the reflective display is observed in the sunny outdoor environment. Due to wide angle allowance of the incident light, the reflectivity of the display relatively change little so that the sufficient reflective display is obtained under various circumferences and the reduction effect of the directivity of the reflective display is obtained.

As shown in FIG. 10B, the bending construction of whole electrodes are adopted in the present embodiment for the purpose of further reducing the directivity of the reflective display characteristics. The electrode construction adopted for the present embodiment is based on the letter "V" shape as shown in the fourth embodiment. However the quantity of the bending points is increased to be four instead of one as seen in the fourth embodiment. At the points of quarter length from the terminal of the pixel electrode, the pattern of comb like electrodes 21 and 22 are bended. The normal directions of the slope surfaces of the edge portions of the comb like electrodes increase to 8 directions (61 to 68) and further isotropic characteristic is obtained.

The electro-optical characteristics of the IPS scheme, that are the threshold voltage and saturation voltage, depend on the angle made by the initial orientation of the liquid crystal and the direction of electric field. Since the angles of the comb like electrodes 21 and 22 against the scanning line are varied, there are areas where the initial orientation of the liquid crystal and the electric fields are different and the electro-optical characteristics are different. Since the electro-optical characteristics in a single pixel are supperimposes of all points, the drive voltage dependence of the light transmission is relaxed and the presentation of fine gradation can be obtained.

Sixth Embodiment

Figure 11A:
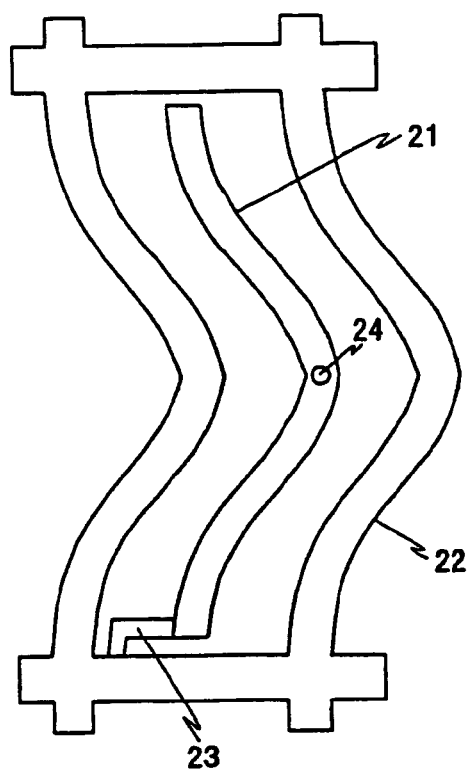
FIG. 11A is a schematic that shows the sixth embodiment of the present invention, especially the patterning of the pixel electrode 21 and the common electrode 22.

FIG. 11A shows further improvement to obtain the better isotropic directivity of the reflective display characteristics by curving overall of the comb like electrodes. The comb like electrodes 21 and 22 are formed into a shape of the letter "U". The angle of the comb like electrodes 21 and 22 against the scanning line is continuously varying. The normal directions of the points on the slope surface at the edge portions of the comb like electrodes covers wide solid angle in the reflective display space. Therefore, the sixth embodiment provides further isotropic property than the fifth embodiment.

Seventh Embodiment

Figure 11B:
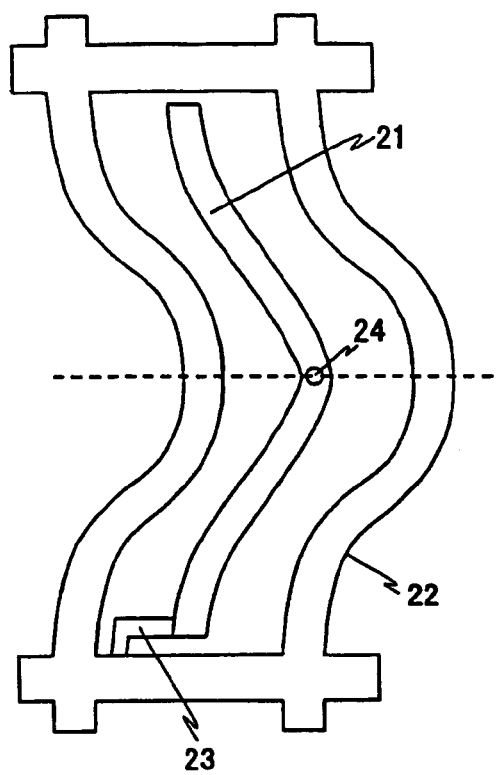
FIG. 11B is a schematic that shows the seventh embodiment of the present invention, especially the patterning of the pixel electrode 21 and the common electrode 22.

The invention shown in FIG. 11B provides further embodiment that has less interference of the lights reflected on the pixel electrode 21 and the common electrode 22 by the difference between the curving patterns amongst the comb like electrodes 21 and 22. Since the all physical dimensions of the pixel electrode 21 and the common electrode 22 are shorter than the coherent length of the lights, the lights reflected at the different portions of the pixel electrodes 21 and the common electrodes 22 may interfere each other so that the reflected lights are repeatedly intensified or quenched in periodical patterns. The image given in the reflective display is damaged by such interference and the colored fringes by diffraction as well.

In the sixth embodiment, the comb like electrodes 21 and 22 has "U" shape form and the slope at the edge portion of the electrodes by which wide solid angle is obtained. In addition to this configuration of the electrodes, the adjacent pixel electrode 21 and the common electrode 22 have different pattern. In order to suppress the "dark line" where the orientation of the liquid crystal against the electric field is 90 degrees, the area where the tangential lines of the pixel electrodes 21 and the common electrodes 22 are vertical to the direction of the scanning line. The area is, as shown in FIG. 11B, just a point on a dotted line.

For the application to the portable phones, the standard requirement for the resolution is about 200 pixels per inch. Since the pixel dimensions are 40×120 micro meters, the pixel pattern is that the one pixel electrode and two common electrodes are place in the center and the both sides, respectively, provided the resolution is about 5 micro meters. In order to keep the same degree of the light scanning in each pixel, it is necessary to make the configurations of all pixels same. Further to such configuration, all of the pixel electrodes are formed in the same patterns and all of the common electrodes are formed in the other same patterns to obtain the pattern difference between a pixel electrode and adjacent common electrodes.

The concrete patterns of the pixel electrode 21 and the common electrode 22 are, for example, one of the pixel electrode 21 and the common electrode 22 has the larger curvature of the letter "S" curve that the other. FIG. 11B shows the case that the common electrode 22 has the larger curvature than the pixel electrode 21.

The coherence length of the lights in the natural environment is about 20 micro meters and the artificial illuminations such as fluorescent lamps emit the similar coherent lights. Within the coherence length, the pattern of the pixel electrode 21 and the common electrode 22 are included. The distance between the pixel electrode 21 and the common electrode 22 continuously varies since the pixel electrode 21 and the common electrode 22 have the different pattern as shown in FIG. 11B.

Eighth Embodiment

The seventh embodiment has "U" shape comb like electrodes 21 and 22 so that there is a portion where the orientation of the liquid crystal and the electric field has 90 degrees as shown by the dotted line in FIG. 11B. At this portion, the changing direction of the orientation of the liquid crystal is hardly determined when the voltage is applied. The liquid crystal shows the right rotation or the left rotation of the nematic twist in the substrate plane when the voltage is applied. When the angle of the orientation of liquid crystal to the electric field is close to 90 degrees, then both rotations tend to be made and the rotational direction is hardly determined. As the result, the dark area where no increase of the light transmission is obtained when the voltage is applied is widely generated along the dotted line shown in FIG. 11B as the center line. The generation of the dark line is not preferable since the transmission and reflection are reduced.

Figure 11C:
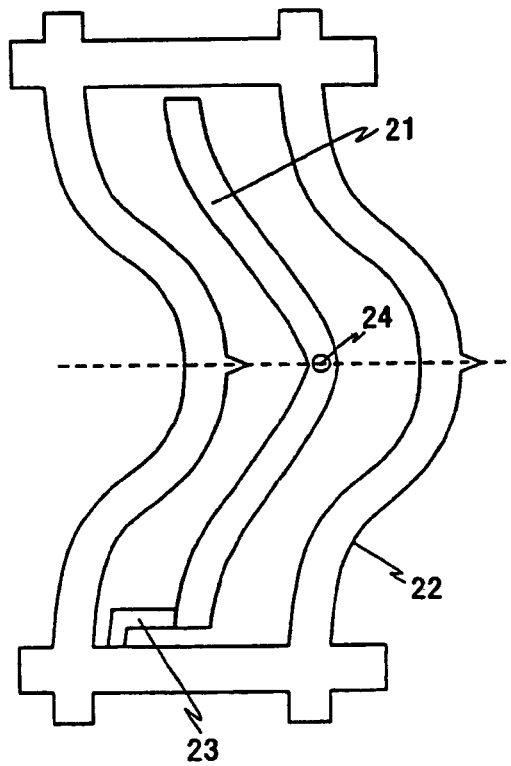
FIG. 11C is a flow chart that shows the eighth embodiment of the present invention, especially the patterning of the pixel electrode 21 and the common electrode 22.

The projection portions are made on the comb like electrodes 21 and 22 along the dotted line as shown in FIG. 11C. According to the localized electric fields at the projections, the angles between the orientation of the liquid crystal and the electric fields are sufficiently smaller than 90 degrees and then rotational direction of the nematic twist is easily determined when the voltage is applied. By using these projections, the dark line is confined into the narrow areas where the angles between the orientation of the liquid crystal and the electric fields are exactly 90 degrees, which resultantly reduce the areas of dark lines over the LCD panel.

Ninth Embodiment

Figure 12A:
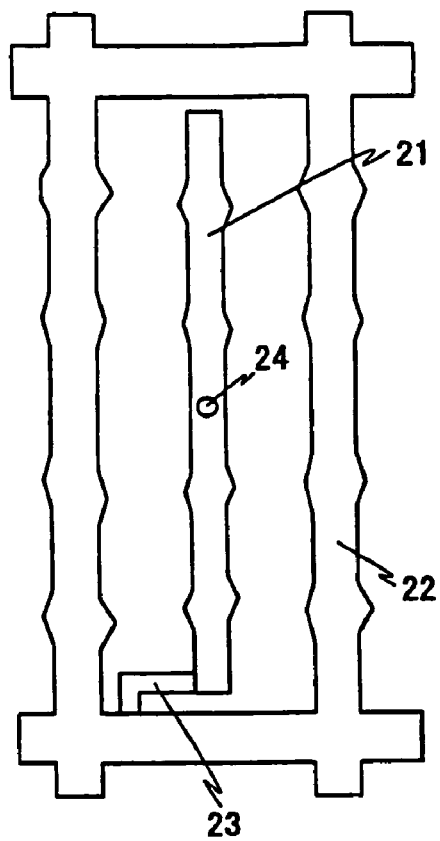
FIG. 12A is a schematic that shows the ninth embodiment of the present invention, especially the patterning of the pixel electrode 21 and the common electrode 22.

FIG. 12A shows another embodiment of the electrode shapes. The comb like electrodes 21 and 22 are deformed to have micro projections in the edge portions of the electrodes by which the directivity of the reflection is suppressed. In this embodiment, the micro projection patterns are added to the straight edge lines of the electrodes seen in the first embodiment so that the wavy edge lines are obtained and the directions of the electrode pattern fringe divert in each pixel. The placement of the projection pattern is different to the pixel electrode and the common electrode to suppress the interference amongst the reflected lights on the electrodes.

Tenth Embodiment

Figure 12B:
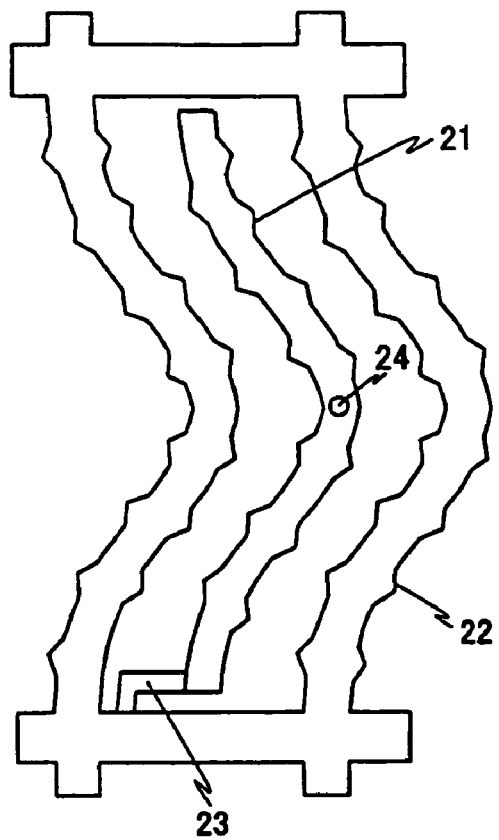
FIG. 12B is a schematic that shows the tenth embodiment of the present invention, especially the patterning of the pixel electrode 21 and the common electrode 22.

FIG. 12B shows further embodiment where the projections are added to the curved comb like electrodes 21 and 22 which have been provided in the ninth embodiment, by which further improvement of isotropic directivity is obtained. The third isolation layer 17 and the comb like electrodes 21 and 22 are made by photolithography technology to which a new photo mask having these projection patterns is used.

More specifically, FIG. 11B shows the projection edge pattern of the electrodes and the directions of the electrode pattern fringe divert in each pixel. The diversion is enhanced by adding the projection pattern to the "V" shape electrodes so that further isotropic reflection is obtained.

Eleventh Embodiment

Figure 13A:
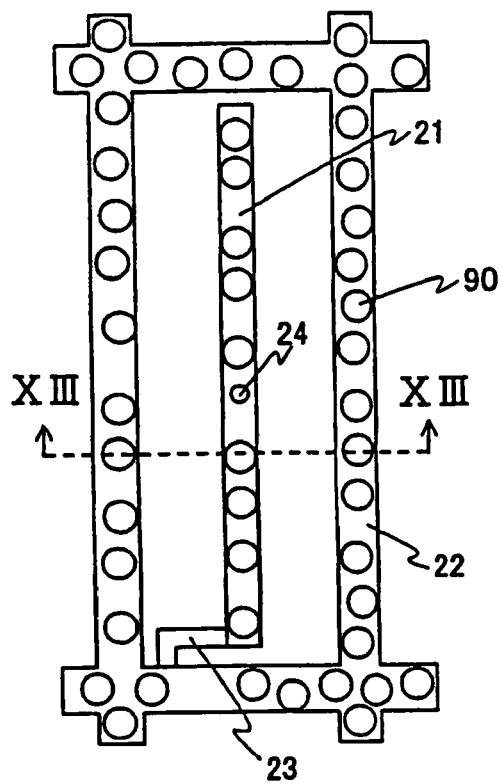
FIG. 13A is a schematic that shows the eleventh embodiment of the present invention, especially the patterning of the pixel electrode 21 and the common electrode 22.

FIG. 13A shows another embodiment where no planer pattern of the comb like electrodes 21 and 22 is maintained and micro corrugation 10 is added on the so that directivity of the reflective display is reduced. In this embodiment, the micro corrugation 90 is formed on the comb like electrodes 21 and 22. Each projective shape has rotational quadratic surface and therefore the reflection mostly covers all-sky angle due to the light scattering reflection on the micro corrugation surface shape. In other words the normal direction on the corrugation diverts more than that of the first embodiment.

The construction such that the corrugation is formed on the comb like electrodes which have a projection pattern is manufactured by the following process. When the third isolation layer 17 is formed by the photo lithography process, grating masks which enable the progressive exposure are used. The recessed portions on the corrugation formed on the comb like electrodes are incompletely exposed and the thickness of the isolation layer is left as being thin. The projection portions on the corrugation formed on the comb like electrodes are not exposed and the thickness of the isolation layer is left as being thick. The third layer 17 is sintered and the pattern of the projective shape has rotational quadratic surface. By using grating mask, the progressive thickness of the isolation layer can be obtained with a single photo lithographic process. The irregular positioning of the projections in the corrugation pattern enables to suppress the interference of the lights reflected on the surface of the electrodes.

Twelfth Embodiment

Figure 13B:
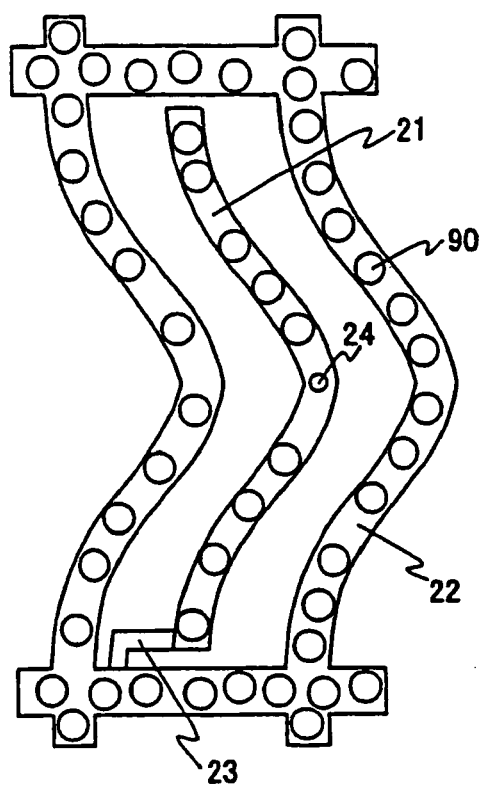
FIG. 13B is a schematic that shows the twelfth embodiment of the present invention, especially the patterning of the pixel electrode 21 and the common electrode 22.
Figure 13C:
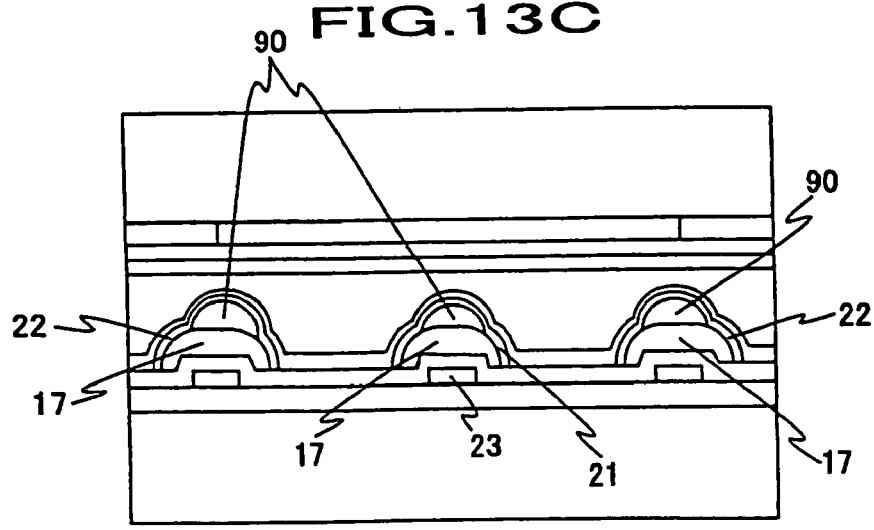
FIG. 13C is a schematic that shows a cross section view of FIG. 13A cut in the line XIII-XIII.

FIG. 13B shows the twelfth embodiment where the corrugation structure 90 is exploited in order to reduce the directivity of the reflection display. This embodiment is provided by adding the corrugation structure 90 to the comb like electrodes 21 and 22 as shown in the sixth embodiment. The comb like electrodes 21 and 22 as shown in the sixth embodiment have "U" shape pattern and the normal direction of the electrode surface has wide solid angles since the corrugation structure is added. The irregular positioning of the projections in the corrugation pattern enables to suppress the interference of the lights reflected on the surface of the electrodes.

The manufacturing process of the third isolation layer 17 is explained where the conventional manufacturing process is adopted in stead of the process applied to the present invention. For example, the third isolation layer 17 as shown in FIG. 21 to 24 has the substantial rectangular cross section. Therefore the common electrode 22 and the pixel electrode 21 on the third isolation layer 17 can be flat.

A driving unit and a back light unit are attached to the present transflective IPS LCD panel for the evaluation of the display characteristics. The reflective display capability is obtained as well as the first embodiment. But no reflective display is observed in the dark place when the back light is turned off.

Figure 21:
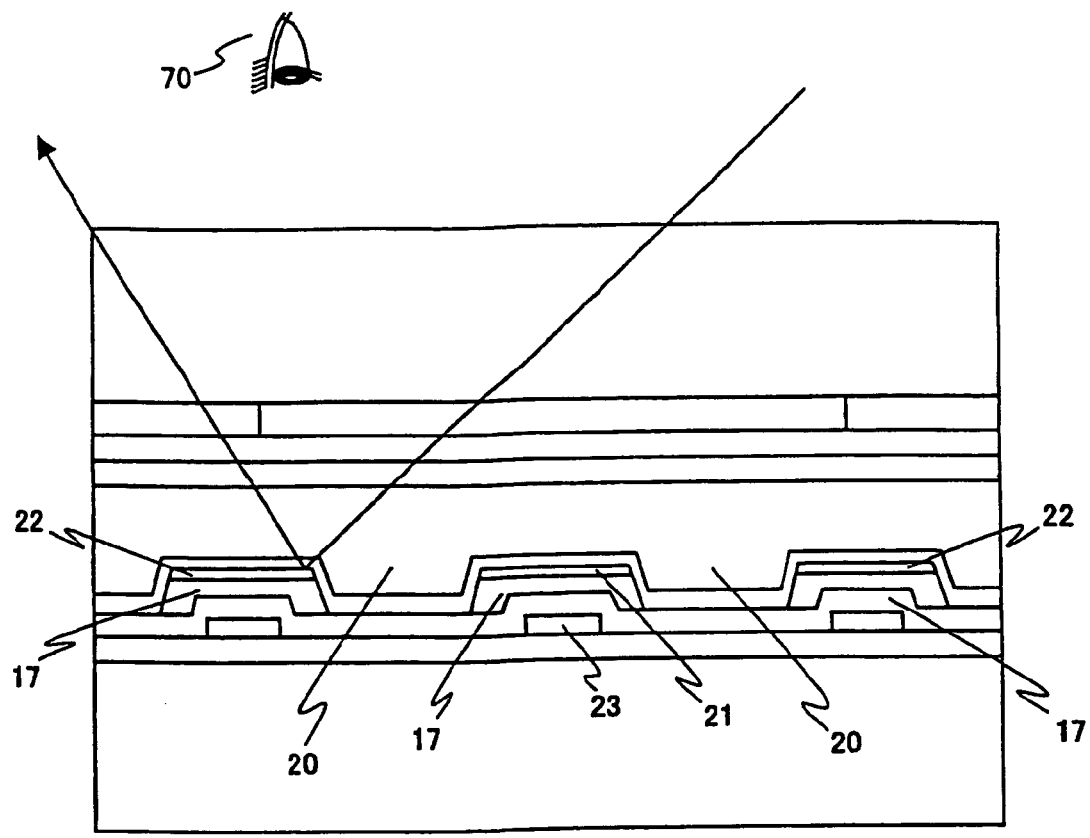
FIG. 21 is a cross sectional schematic that shows the relation of the incidental light, reflected light and a viewer regarding the conventional reflective display panel.
Figure 22:
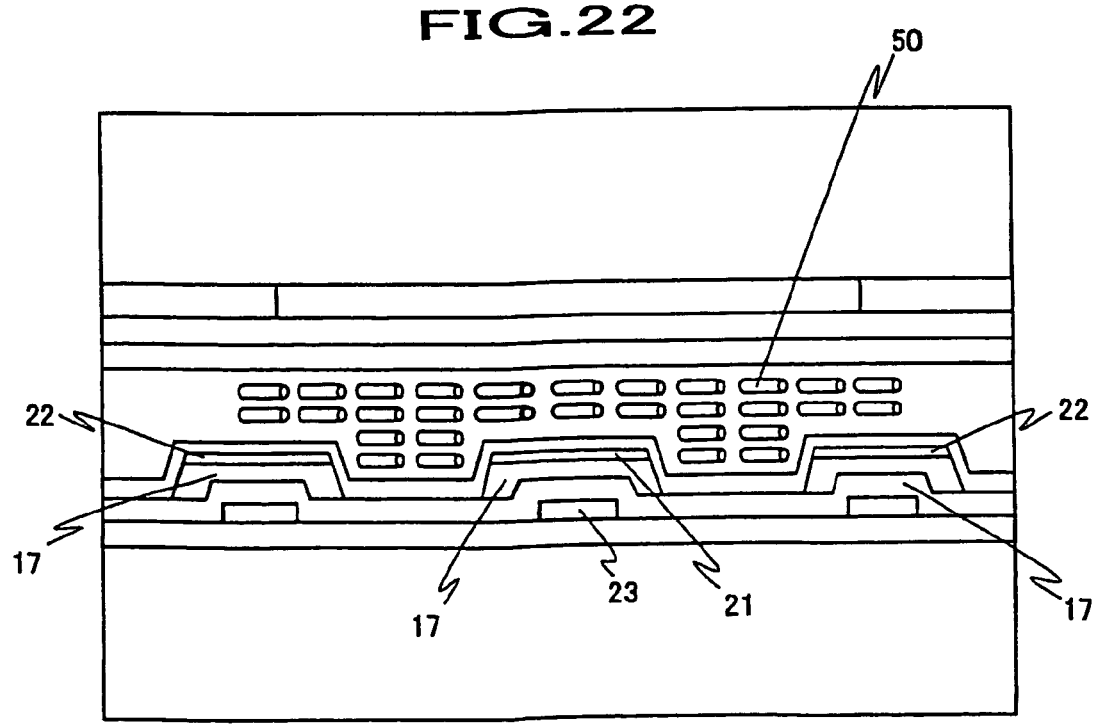
FIG. 22 is a schematic that shows the orientation of the liquid crystal molecule in cane no voltage applied regarding the conventional liquid crystal display panel.

The reason why no reflective display is observed in the case when the flat common electrodes and the pixel electrodes are exploited is explained as follows. FIG. 21 shows the viewing direction of the viewer and the directions of the incident light and the emitting light. The incident light from the deviated angle against the normal angle to the viewer is reflected on the flat surface of the common electrode 22 and the pixel electrode 21 and therefore the incident angle and the emitting angle are substantially same and the orientation is same so that the most of such deviated-angle incident lights do not travel to the viewer.

Figure 23:
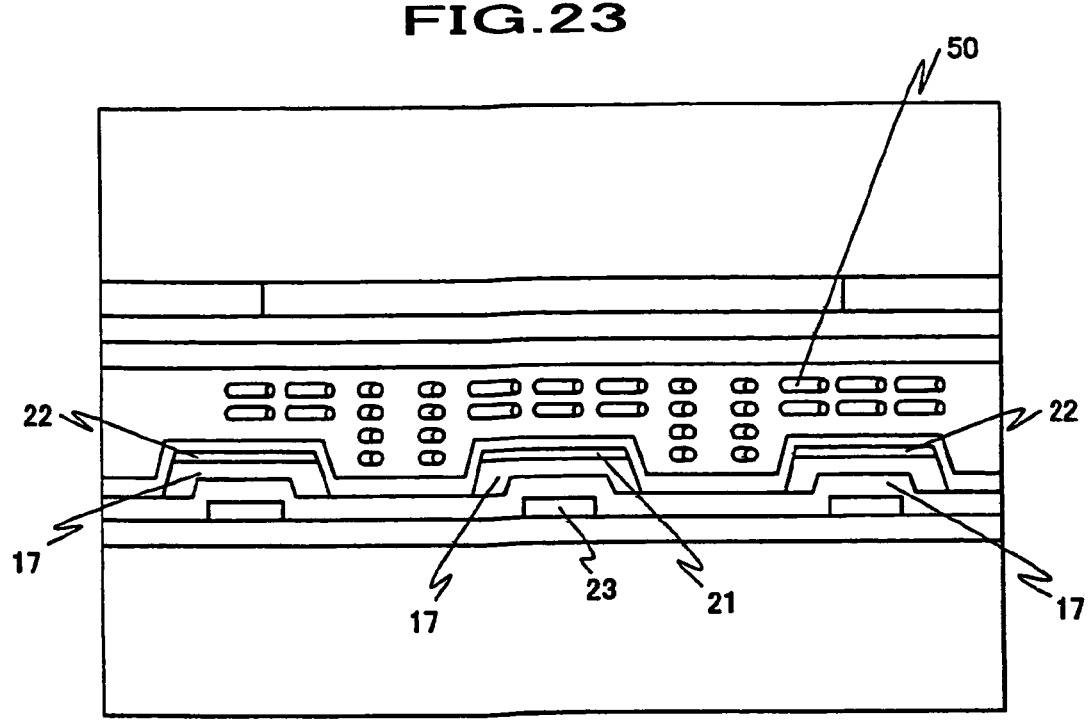
FIG. 23 is a schematic that shows the orientation of the liquid crystal molecule in cane no voltage applied regarding the conventional liquid crystal display panel.
Figure 24:
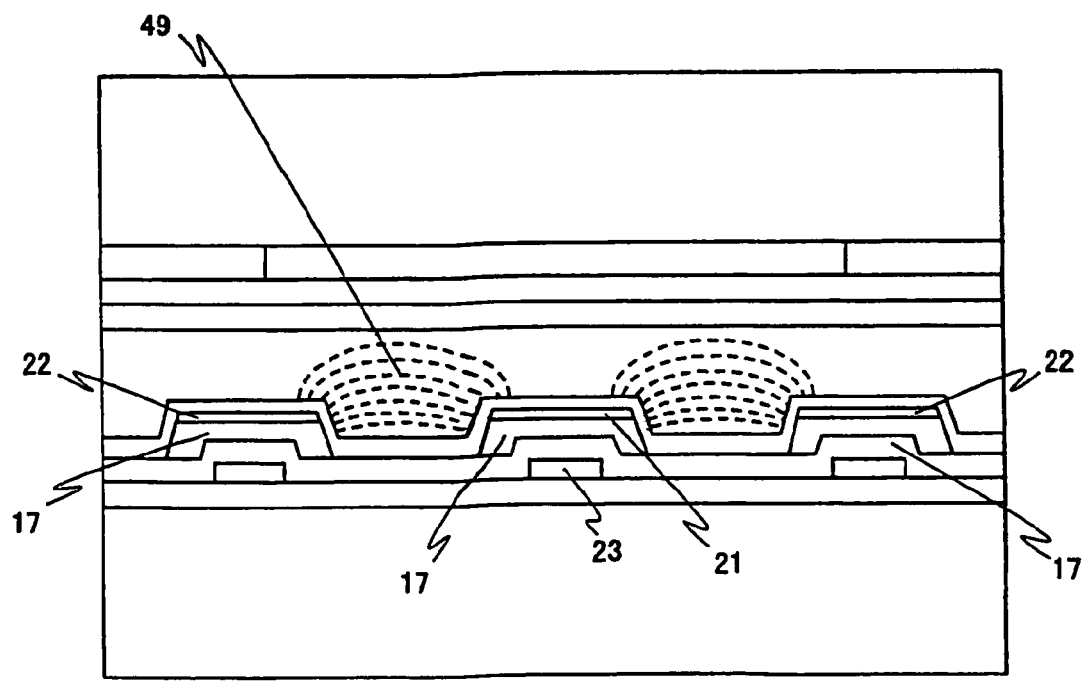
FIG. 24 is a cross sectional schematic that shows the electric flux lines 49 in case of voltage applied regarding the conventional liquid crystal display panel panel.

FIG. 24 shows the electric flux 49 which is generated between the common electrode 22 and the pixel electrode 21 when voltage is applied. The electric fields above the common electrodes and the pixel electrodes are very week. In FIG. 7 which shows the distribution of the electric flux generated in the LCD panel of the first embodiment, the lateral electric field on the common electrode and the pixel electrode exists. FIG. 23 shows the orientation of the liquid crystal molecule 50 in the conventional LCD. According to the lack of the electric fields on the common electrodes 22 and the pixel electrodes 21, the change of orientation of the liquid crystal molecule 50 hardly is generated and therefore the orientation is almost same as the case when no voltage is applied even when voltage is applied. In other words, the orientation of the liquid crystal is always in the same reflectivity of the liquid crystal and therefore is always in "dark" display irrelevant to the cases of voltage applied or no voltage applied.

As have been explaining, when flat common electors and the flat pixel electrodes are used, no reflective display is provided by two reasons, that is, the incident lights do not travel to the viewer and the liquid crystal orientation does not change. However the present invention solves these two reasons for such problem of the LCD panel.

Thirteenth Embodiment

The viewing angle characteristics of the transmitting display of the first LCD panel is, as shown in FIG. 18A, almost constant up to the polar angle 20 degrees. More than ±20 degrees of the polar angle, the "dark" transmitting display increases with the polar angle. Therefore the contrast ratio is degraded when the viewing angle is deviated in such polar angle. According this property, it is necessary to suppress the "dark" transmission at the large polar angle for the transflective IPS LCD panel given by the first embodiment.

Figure 19:
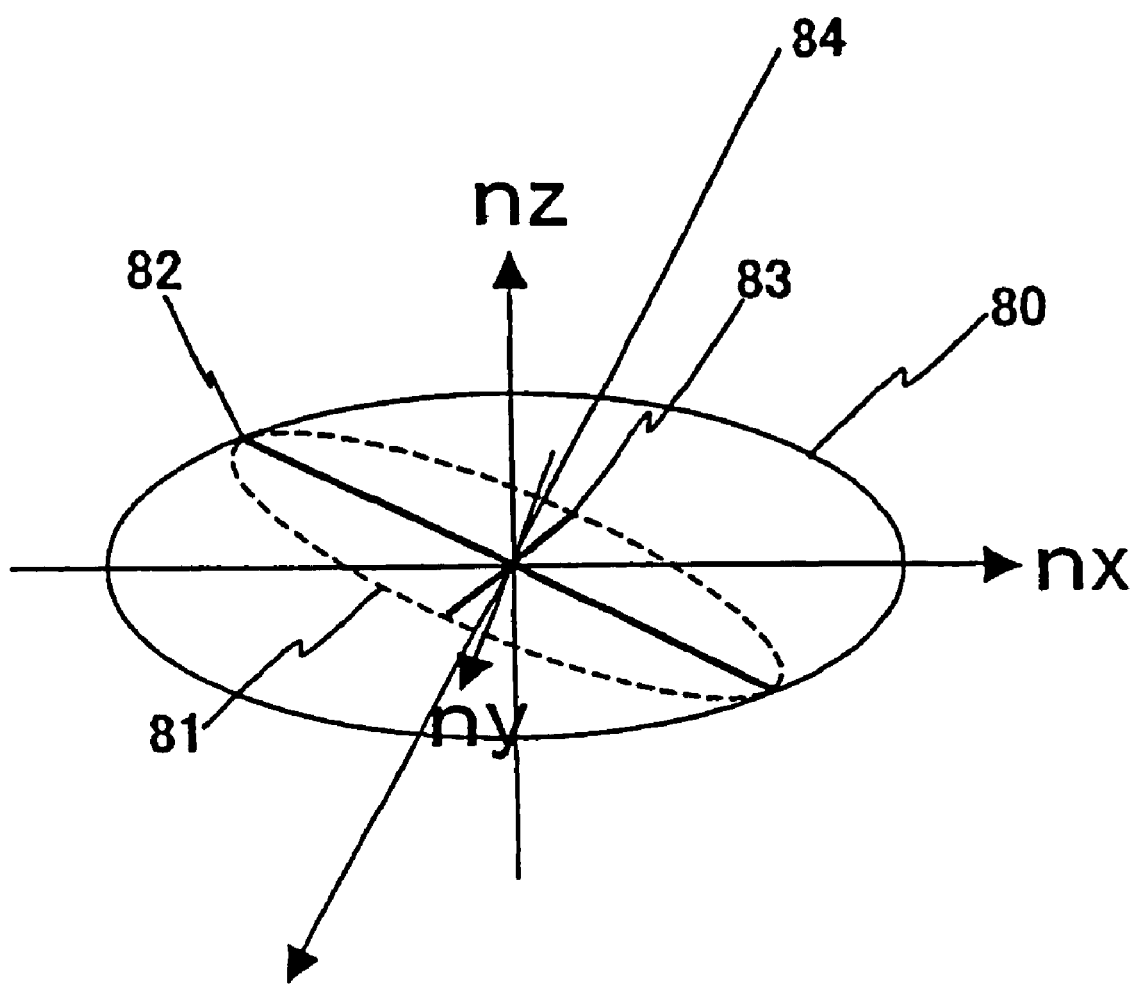
FIG. 19 is a schematic that shows the method to determine the element related to the viewing angle of the birefringence medium and the optical characteristics of the birefringence medium.

FIG. 19 shows the behavior and the optical characteristic determination of the birefringent media. The viewing angle characteristic of the birefringence is provided by the refractive indices of the delay traveling axis and the advance traveling axis. The refractive indices are given by the geometrical treatment of the index ellipsoid 80.

The index ellipsoid has the refractive indices as nx, ny and nz in x-axis, y-axis and z-axis, respectively. The axes are parallel to x-axis, y-axis and z-axis in the real space. Assuming a straight line that is parallel to the viewing direction 84 and passes through the center point of the index ellipsoid and make a cross sectional plane 81 which is normal to the straight line and the center point is therewithin. The length of the long axis is the refractive index of the delay traveling axis and the short axis is that of the advance traveling axis.

Therefore, the optical characteristics of the birefringent media are determined by nx, ny and nz and these are generally presented by Nz coefficients. Nz coefficients is given by an article (Yasuo Fujimura, Tatsuki Nagatsuka, Hiroyuki Yoshimi, Takefumi Simomura, pp. 739-742, SID '91 DIGEST (1991)) as;

$$Nz=(nx-nz)/(ny-ny) \qquad (3)$$

If the Nz coefficient is different, the viewing angle characteristic is different. As a concrete embodiment, the birefringent meida 1 of Nz=1.0 is placed in such a manner that the delay traveling axis has 45 degrees on the basis of the observed normal direction of the substrate. FIG. 20A shows the change of the optical characteristics of the birefringent medium 1 for the case when the incident angle changes as the pole angle increases for 90 degrees azimuthal angle. The index ellipsoid of the birefringent medium 1 has the longest axis in the delay traveling axis when it is observed in the direction normal to the substrate and the ellipsoid has the rugby ball shape. Therefore the cross section of the index ellipsoid changes to become parallel to the horizontal direction as the pole angle increases. Concurrently, the long axis of the cross section becomes close to the horizontal line.

Next, the birefringent medium 2 of Nz=0.0 which is placed such that the delay traveling axis is 135 degrees when it is observed from the normal direction against the substrate surface. FIG. 20B shows the optical characteristics of the birefringent media 2 in the case when the incident light direction changes in a manner that the pole angle increases at 90 degrees azimuthal angle as same as in FIG. 20A. The index ellipsoid is shortest in the advance traveling axis when it is observed in the normal direction against the substrate surface and is longest in right angle to such advance traveling axis and has the convex lens shape. Therefore the cross section of the index ellipsoid increases thickness toward the normal direction as polar angle increases and inflate in the vertical direction. At the same time, the long axis becomes close to the vertical direction.

FIG. 20C shows the simultaneous observation of the birefringent meida 1 and the birefringent medium 2. In order to remark the delay traveling axe of the birefringent medium 1 and the birefringent medium 2, the axe are denoted by 85 and 86 in FIG. 20C. The delay traveling axe of the birefringent medium 1 and the birefringent medium 2 are vertically placed. When the polar angle increases with azimuthal angle of −90 degrees, the long axis of the cross section of the index ellipsoid of the birefringent medium 1 increases with the polar angle increases and becomes close to the horizontal direction and the long axis of the cross section of the index ellipsoid of the birefringent medium 2 becomes close to the vertical direction.

In other words, both rotate in anti-clock wise and the rotational speed in accordance with the increase of the polar angle is same. Therefore, the delay traveling axe of the birefringent media 1 and 2 are kept vertical. This implies that this fact is correct not only for −90 degrees azimuthal angles but also in all directions of the azimuthal angles.

As have been explaining, a pair of two birefringent media of which the delay traveling axe are vertical in the normal direction of the substrate has the relation one of the birefringent media has Nz=1 and the other Nz=0. Then the wide viewing angles are cancelled by the retardation of the both media. The delay traveling axe which are in right angle when they are seen in the normal direction against the substrate in the first embodiment are for a pair of the transmissive display of the liquid crystal layer and the second phase plate and another pair of the first phase plate and the third phase plate.

To begin with, the pair of the transmissive display of the liquid crystal layer and the second phase plate is considered. The transmissive display of the liquid crystal layer consists of the nematic liquid crystal and the orientation status is in homogeneous orientation. The nematic liquid crystal has the positive single axis and the transmissive display of the liquid crystal layer therefore shows nx>nz=ny and Nz=1. Then the second phase plate which is the other one of the pair is set to be Nz=0. As for the first phase plate and the third phase plate, they can be as the first phase plate shows Nz=0 and the third phase plate Nz=1 or the first phase plate Nz=1 and the third phase plate Nz=0. The latter is selected in the present discussion.

Figure 18B:
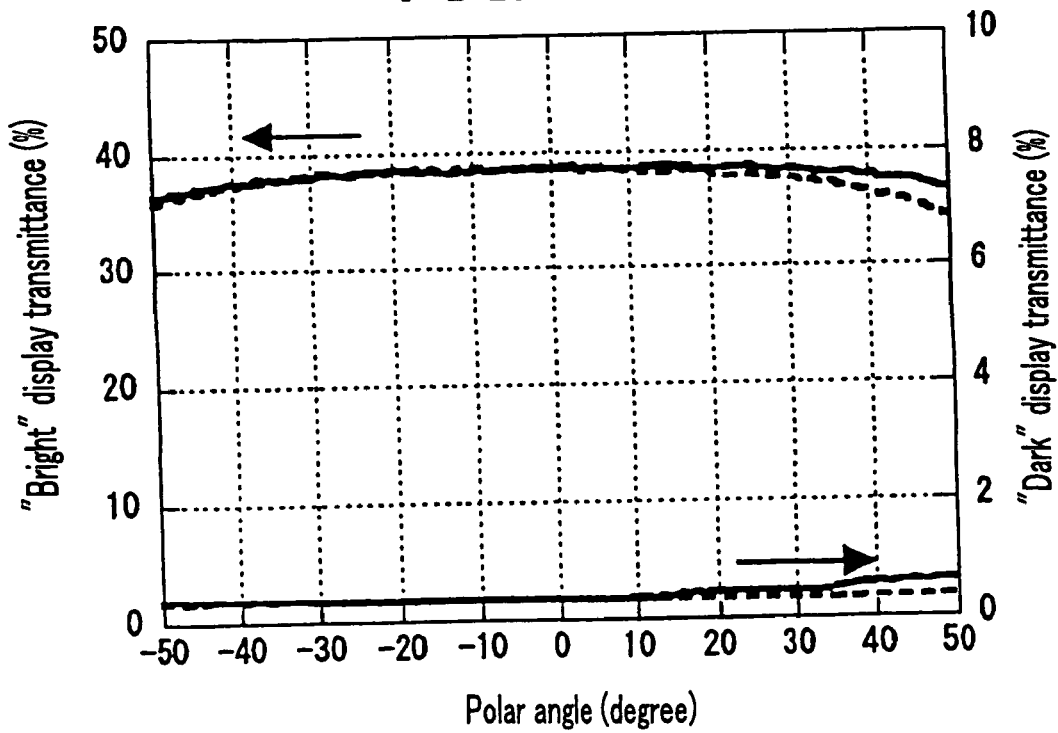

FIG. 18*b* shows the transmissive display viewing angle characteristics of the present embodiment of the transflective IPS LCD panel. In comparison to FIG. 18A, the "dark" display transmission at the large polar angles are reduced and the improvement of the phase difference compensation is observed in the viewing direction by optimizing the pairing of Nz coefficients.

Fourteenth Embodiment

In this embodiment, the upper and the lower alignment layers are replaced with the vertical alignment layer in the LCD panel given in the first embodiment. The vertical alignment layer has an organic macromolecule of polyimide that has alkyl in the side chain. For the liquid crystal material, positive anisotropy permittive nematic material is used.

Figure 15:
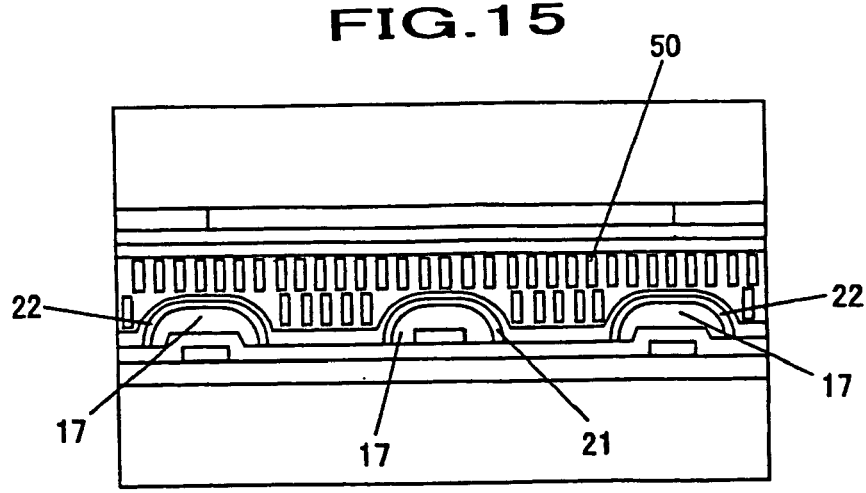
FIG. 15 is a schematic that shows a cross sectional view of the orientation of the liquid crystal molecule in case of no voltage is applied regarding the fourteenth embodiment of the present invention.

FIG. 15 shows the cross section of the LCD panel of the present embodiment. FIG. 15 shows the status when no voltage is applied to the liquid crystal layer which has orientation in substantially in the normal direction against the substrate by replacing the upper and lower orientation layers with the vertical orientation layer.

Since the orientation of the liquid crystal layer is vertical orientation with no voltage applied, the retardation is about zero in both reflective display and the transmissive display in the normal direction on the substrate. In order to keep this state as "dark" display, the optical condition of the phase plate and the polarizer.

To begin with, the optical conditions of the phase plate and the polarizer on the fist substrate are determined for the purpose that the reflective display shows the "dark" display. The first phase plate is placed on the first substrate and the retardation is set to be a quarter wave lengths. Taking the normal direction against the comb like electrodes as the reference direction, the delay traveling axis is placed in 45 degrees to the normal direction of the comb like electrode. Moreover, the first polarizer is placed over the first phase plate and the transmission axis is placed to have 90 degrees against the normal direction against the comb like electrodes.

A circular polarization is made by the first phase plate and the first polarizer. Since the retardation of the liquid crystal layer is zero, the circular polarized lights by the first phase plate and the first polarizer goes into the common electrodes and pixel electrodes and then the "dark" display is realized. A reverse dispersion phase plate that shows the retardation increase in accordance with the increase of wave length is used for the first phase plate and then achromatic reflective display with low reflectivity is obtained since the reflectivity can be reduced in the wide wave length in the visible wavelength range.

Next, the optical condition of the phase plate and the polarization that are placed underneath the second substrate in order to set the transmissive display "dark" display are determined. A piece of phase plate is used underneath the second substrate, the retardation is set to be a quarter wave length as same as the first phase plate, the delay traveling axis is set to be normal to the delay traveling axis of the first phase plate. By this configuration, the retardation of the first phase plate is canceled and the retardation of the first phase plate against the multi-layer of a liquid crystal layer and the second phase plate becomes zero.

Figure 16:
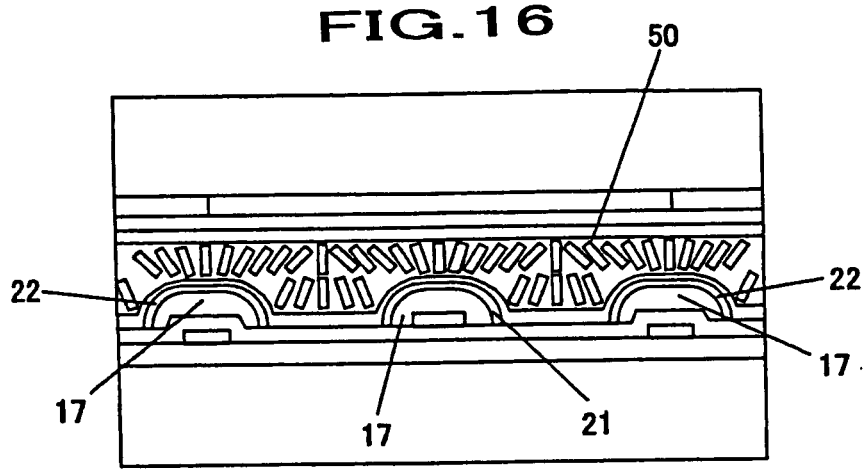
FIG. 16 is a schematic that shows a cross sectional view of the orientation of the liquid crystal molecule in case of voltage is applied regarding the fourteenth embodiment of the present invention.

One voltage is applied between the pixel electrodes and the common electrodes, the substantially same electric flux as shown in FIG. 7 is generated and the orientation of the liquid crystal is shown in FIG. 16. Since the liquid crystal material has the positive permittivity isotropy, the orientation of the liquid crystal changes as being parallel to the electric flux. As the result, the retardation is generated in the liquid crystal layer and "bright" display is present in both the reflective display and the transmissive display.

The details of FIG. 16 show that the liquid crystal layer has vertical orientation in the center region above the pixel electrode and the common electrode. This is due to the fact that no electric field exists in this region. The liquid crystal layer has vertical orientation between the pixel electrode and the common electrode. This is due to the phenomenon that the orientation in the pixel electrode and the orientation in the common electrode are mutually reverse direction and are competitively cancelled out at the central region. The liquid crystal at the arbitral point between the pixel electrode and the common electrode, the electric fluxes in the pixel electrode and the common electrode are mutually in the reverse direction. As the result, the liquid crystal layer is divided into two domains and wide viewing angle is obtained.

According to the declined slope at the edge portion of the pixel electrodes and the common electrodes, the present embodiment where the orientation of the liquid crystal is designed to be vertical with no voltage applied provide an operation that the liquid crystal on the pixel electrodes and the common electrodes function to change reflectivity with applying voltage. Since the liquid crystal panel of the present invention has the declined slope at the edge portion of the pixel electrodes and the common electrodes, the thickness of the liquid crystal of the reflective display does not become homogenous in location but inhomogeneously diverts. The orientation of the liquid crystal layer in the case of no voltage applied is the vertical orientation for the present embodiment, the retardation of the liquid crystal layer is substantially zero irrelevant to the thickness of the liquid crystal layer. Therefore the retardation over the slope of the edge portions becomes homogeneously zero. As the result, the "dark" display in the reflective display becomes low reflectivity and high contrast ratio in the reflective display is obtained.

Fifteenth Embodiment

Figure 17:
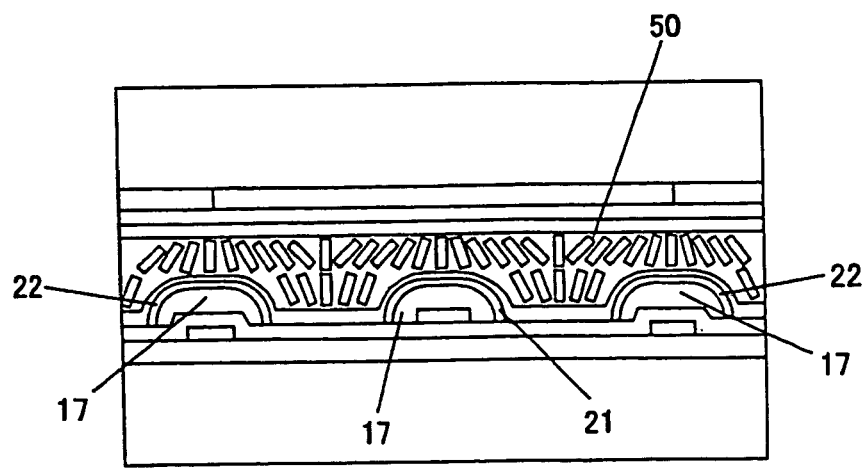
FIG. 17 is a schematic that shows a cross sectional view of the orientation of the liquid crystal molecule in case of voltage is applied regarding the fifteenth embodiment of the present invention.

The present embodiment has the configuration that the liquid crystal that shows negative permittivity isotropy has the vertical orientation of the liquid crystal with no voltage applied. FIG. 17 shows the cross section of the LCD panel with no voltage applied. Since the orientation of the liquid crystal layer changes vertical to the electric flux, the orientation of the liquid crystal reversely changes against the fourteenth embodiment as shown in FIG. 16.

In other words, the liquid crystal layer at an arbitral point between the pixel electrode and the common electrode shows the change of the orientation in direction towards the center point between the pixel electrode and the common electrode as shown in FIG. 16 for the case of fourteenth embodiment. However the present embodiment shows the change of the orientation in direction towards the terminal portions of the pixel electrode and the terminal portions of the common electrode as shown in FIG. 17. In this case, the reflective display in high contrast ratio and the reflective display and transmissive display in wide viewing angle are obtained.

Sixteenth Embodiment

The present embodiment has a configuration that the liquid crystal has vertical orientation with no voltage applied in the bended planar construction of the pixel electrodes and the common electrodes as shown in FIG. 10 and FIG. 11. In this case, the orientation of the liquid crystal with no voltage applied is divided into four directions and the liquid crystal layer is divided into more than four domains. Therefore the viewing angle characteristics diverts into various directions and the homogenous view angle characteristics and wide viewing angle characteristics are obtained in reflective display and the transmissive display.

What is claimed:

1. A transreflective liquid crystal display panel comprising a first substrate and a second substrate between which plural pixels are formed, a liquid crystal layer disposed between said first substrate and said second substrate, a driving means to drive orientation of liquid crystal of said liquid crystal layer, common electrodes commonly connected to a voltage supply and a pixel electrodes each of which is electrically connected to said driving means and disposed between two of said common electrodes, wherein said common electrodes and said pixel electrode are formed over said second substrate and have slope surfaces around pattern edges thereof tilting against said second substrate, on which incident light passing through said first substrate and said liquid crystal layer reflects wherein voltage is applied through said driving means between said common electrode and said pixel electrode to drive said orientation of said liquid crystal therebetween, and wherein each of said pixel electrodes and said common electrodes is bent to form a smooth curved shape against said second substrate when viewed from a plan view.

2. A transreflective liquid crystal display panel according to claim 1,
wherein said pixel electrodes are connected to signal lines trough a via hole and said driving means wherein said signal lines are vertical to scanning lines.

3. A transreflective liquid crystal display panel according to claim 1,
wherein said driving means is composed of a thin film transistor.

4. A transreflective liquid crystal display panel according to claim 1,
wherein each electrode of said pixel electrodes and said common electrodes has curved slope surfaces which tilt against said second substrate.

5. A transreflective liquid crystal display panel according to claim 1,
wherein contour lines of each electrode of said pixel electrodes and said common electrodes have additional micro pattern contours therearound.

6. A transreflective liquid crystal display panel according to claim 5,
wherein said additional micro pattern contours are formed non-periodically in contour lines of each electrode of said pixel electrodes and said common electrodes.

7. A transreflective liquid crystal display panel according to claim 1,
wherein a segment of said pixel electrodes and a segment of said common electrodes which correspond to said pixels are not in parallel and not the same shape and not the same curvature within said pixel.

8. A transreflective liquid crystal display panel according to claim 1,
wherein said pixel electrodes and said common electrodes have a corrugated surface thereon.

9. A transreflective liquid crystal display panel according to claim 8,
wherein corrugation of said corrugated surface of said pixel electrodes and said common electrodes are non-periodically formed.

* * * * *